(12) United States Patent
Coleman et al.

(10) Patent No.: US 9,223,022 B2
(45) Date of Patent: *Dec. 29, 2015

(54) LINEAR AND CIRCULAR DOWNSCAN IMAGING SONAR

(71) Applicant: Navico Holding AS, Egersund (NO)

(72) Inventors: Aaron Coleman, Broken Arrow, OK (US); Jeffrey W. Hanoch, Broken Arrow, OK (US); Brian Maguire, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 682 days.

This patent is subject to a terminal disclaimer.

(21) Appl. No.: 13/627,546

(22) Filed: Sep. 26, 2012

(65) Prior Publication Data

US 2015/0253425 A1 Sep. 10, 2015

Related U.S. Application Data

(63) Continuation of application No. 12/460,093, filed on Jul. 14, 2009, now Pat. No. 8,300,499.

(51) Int. Cl.
| | |
|---|---|
| *G01S 15/00* | (2006.01) |
| *G01S 15/89* | (2006.01) |
| *G01S 15/87* | (2006.01) |
| *G01S 7/04* | (2006.01) |
| *G01S 7/52* | (2006.01) |
| *G01S 15/02* | (2006.01) |

(52) U.S. Cl.
CPC . *G01S 15/89* (2013.01); *G01S 7/04* (2013.01); *G01S 7/52* (2013.01); *G01S 15/02* (2013.01); *G01S 15/87* (2013.01)

(58) Field of Classification Search
USPC .......................................................... 367/88
See application file for complete search history.

(56) References Cited

U.S. PATENT DOCUMENTS

| | | | |
|---|---|---|---|
| 1,667,540 | A | 4/1928 | Dorsey |
| 1,823,329 | A | 9/1931 | Marrison |
| 2,416,338 | A | 2/1947 | Mason |
| 3,005,973 | A | 10/1961 | Kietz |
| 3,090,030 | A | 5/1963 | Schuck |
| 3,142,032 | A | 7/1964 | Jones |

(Continued)

FOREIGN PATENT DOCUMENTS

| | | |
|---|---|---|
| DE | 1 566 870 A1 | 4/1970 |
| DE | 35 16 698 A1 | 11/1986 |

(Continued)

OTHER PUBLICATIONS

Clausner, J.E. and Pope, J., 1988. "Side-scan sonar applications for evaluating coastal structures"; U.S. Army Corps of Engineers, Technical Report CERC-88-16; 80 pages.

(Continued)

*Primary Examiner* — James Hulka
(74) *Attorney, Agent, or Firm* — Alston & Bird LLP

(57) ABSTRACT

A method for providing a combined linear and circular downscan sonar display may include receiving linear downscan sonar data from a linear downscan transducer, receiving conical downscan sonar data from a circular downscan transducer, and combining the linear downscan sonar data and the conical downscan sonar data to produce combined downscan sonar data. A corresponding computer program product and apparatus are also provided.

68 Claims, 17 Drawing Sheets

(56) References Cited

U.S. PATENT DOCUMENTS

| | | | |
|---|---|---|---|
| 3,144,631 | A | 8/1964 | Lustig et al. |
| 3,296,579 | A | 1/1967 | Fan et al. |
| 3,304,532 | A | 2/1967 | Nelkin et al. |
| 3,359,537 | A | 12/1967 | Geil et al. |
| 3,381,264 | A | 4/1968 | Lavergne et al. |
| 3,451,038 | A | 6/1969 | Maass |
| 3,458,854 | A | 7/1969 | Murphree |
| 3,484,737 | A | 12/1969 | Walsh |
| 3,496,524 | A | 2/1970 | Stavis et al. |
| 3,553,638 | A | 1/1971 | Sublett |
| 3,585,578 | A | 6/1971 | Fischer, Jr. |
| 3,585,579 | A | 6/1971 | Dorr et al. |
| 3,618,006 | A | 11/1971 | Wright |
| 3,624,596 | A | 11/1971 | Dickenson et al. |
| 3,716,824 | A | 2/1973 | Dorr et al. |
| 3,742,436 | A | 6/1973 | Jones |
| 3,753,219 | A | 8/1973 | King, Jr. |
| 3,757,287 | A | 9/1973 | Bealor, Jr. |
| 3,781,775 | A | 12/1973 | Malloy et al. |
| 3,895,339 | A | 7/1975 | Jones et al. |
| 3,895,340 | A | 7/1975 | Gilmour |
| 3,898,608 | A | 8/1975 | Jones et al. |
| 3,907,239 | A | 9/1975 | Ehrlich |
| 3,922,631 | A | 11/1975 | Thompson et al. |
| 3,949,348 | A | 4/1976 | Dorr |
| 3,950,723 | A | 4/1976 | Gilmour |
| 3,953,828 | A | 4/1976 | Cook |
| 3,964,424 | A | 6/1976 | Hagemann |
| 3,967,234 | A | 6/1976 | Jones |
| 3,975,704 | A | 8/1976 | Klein |
| 4,030,096 | A | 6/1977 | Stevens et al. |
| 4,047,148 | A | 9/1977 | Hagemann |
| 4,052,693 | A | 10/1977 | Gilmour |
| 4,063,212 | A | 12/1977 | Sublett |
| 4,068,209 | A | 1/1978 | Lagier |
| 4,075,599 | A | 2/1978 | Kosalos et al. |
| 4,096,484 | A | 6/1978 | Ferre et al. |
| 4,121,190 | A | 10/1978 | Edgerton et al. |
| 4,180,792 | A | 12/1979 | Lederman et al. |
| 4,184,210 | A | 1/1980 | Hagemann |
| 4,195,702 | A | 4/1980 | Denis |
| 4,197,591 | A | 4/1980 | Hagemann |
| 4,198,702 | A | 4/1980 | Clifford |
| 4,199,746 | A | 4/1980 | Jones et al. |
| 4,200,922 | A | 4/1980 | Hagemann |
| 4,204,281 | A | 5/1980 | Hagemann |
| 4,207,620 | A | 6/1980 | Morgera |
| 4,208,738 | A | 6/1980 | Lamborn |
| 4,216,537 | A | 8/1980 | Delignieres |
| 4,232,380 | A | 11/1980 | Caron et al. |
| 4,247,923 | A | 1/1981 | De Kok |
| 4,262,344 | A | 4/1981 | Gilmour |
| 4,287,578 | A | 9/1981 | Heyser |
| 4,347,591 | A | 8/1982 | Stembridge et al. |
| RE31,026 | E | 9/1982 | Shatto |
| 4,400,803 | A | 8/1983 | Spiess et al. |
| 4,413,331 | A | 11/1983 | Rowe, Jr. et al. |
| 4,422,166 | A | 12/1983 | Klein |
| 4,456,210 | A | 6/1984 | McBride |
| 4,458,342 | A | 7/1984 | Tournois |
| 4,493,064 | A | 1/1985 | Odero et al. |
| 4,496,064 | A | 1/1985 | Beck et al. |
| 4,538,249 | A | 8/1985 | Richard |
| 4,561,076 | A | 12/1985 | Gritsch |
| 4,596,007 | A | 6/1986 | Grall et al. |
| 4,635,240 | A | 1/1987 | Geohegan, Jr. et al. |
| 4,641,290 | A | 2/1987 | Massa et al. |
| 4,642,801 | A | 2/1987 | Perny |
| 4,751,645 | A | 6/1988 | Abrams et al. |
| 4,774,837 | A | 10/1988 | Bird |
| 4,796,238 | A | 1/1989 | Bourgeois et al. |
| 4,802,148 | A | 1/1989 | Gilmour |
| 4,815,045 | A | 3/1989 | Nakamura |
| 4,829,493 | A | 5/1989 | Bailey |
| 4,855,961 | A | 8/1989 | Jaffe et al. |
| 4,879,697 | A | 11/1989 | Lowrance et al. |
| 4,907,208 | A | 3/1990 | Lowrance et al. |
| 4,912,685 | A | 3/1990 | Gilmour |
| 4,924,448 | A | 5/1990 | Gaer |
| 4,935,906 | A | 6/1990 | Baker et al. |
| 4,939,700 | A | 7/1990 | Breton |
| 4,958,330 | A | 9/1990 | Higgins |
| 4,970,700 | A | 11/1990 | Gilmour et al. |
| 4,972,387 | A | 11/1990 | Warner |
| 4,975,887 | A | 12/1990 | Maccabee et al. |
| 4,982,924 | A | 1/1991 | Havins |
| 5,025,423 | A | 6/1991 | Earp |
| 5,033,029 | A | 7/1991 | Jones |
| 5,077,699 | A | 12/1991 | Passamante et al. |
| 5,109,364 | A | 4/1992 | Stiner |
| 5,113,377 | A | 5/1992 | Johnson |
| 5,142,497 | A | 8/1992 | Warrow |
| 5,142,502 | A | 8/1992 | Wilcox et al. |
| D329,615 | S | 9/1992 | Stiner |
| D329,616 | S | 9/1992 | Stiner |
| 5,155,706 | A | 10/1992 | Haley et al. |
| 5,159,226 | A | 10/1992 | Montgomery |
| 5,182,732 | A | 1/1993 | Pichowkin |
| 5,184,330 | A | 2/1993 | Adams et al. |
| 5,191,341 | A | 3/1993 | Gouard et al. |
| 5,200,931 | A | 4/1993 | Kosalos et al. |
| 5,214,744 | A | 5/1993 | Schweizer et al. |
| 5,231,609 | A | 7/1993 | Gaer |
| 5,237,541 | A | 8/1993 | Woodsum |
| 5,241,314 | A | 8/1993 | Keeler et al. |
| 5,243,567 | A | 9/1993 | Gingerich |
| 5,245,587 | A | 9/1993 | Hutson |
| 5,257,241 | A | 10/1993 | Henderson et al. |
| 5,260,912 | A | 11/1993 | Latham |
| 5,276,453 | A | 1/1994 | Heymsfield et al. |
| 5,297,109 | A | 3/1994 | Barksdale, Jr. et al. |
| 5,299,173 | A | 3/1994 | Ingram |
| 5,303,208 | A | 4/1994 | Dorr |
| 5,376,933 | A | 12/1994 | Tupper et al. |
| 5,390,152 | A | 2/1995 | Boucher et al. |
| 5,412,618 | A | 5/1995 | Gilmour |
| 5,433,202 | A | 7/1995 | Mitchell et al. |
| 5,438,552 | A | 8/1995 | Audi et al. |
| 5,442,358 | A | 8/1995 | Keeler et al. |
| 5,455,806 | A | 10/1995 | Hutson |
| 5,485,432 | A | 1/1996 | Aechter et al. |
| 5,493,619 | A | 2/1996 | Haley et al. |
| 5,515,337 | A | 5/1996 | Gilmour et al. |
| 5,525,081 | A | 6/1996 | Mardesich et al. |
| 5,526,765 | A | 6/1996 | Ahearn |
| 5,537,366 | A | 7/1996 | Gilmour |
| 5,537,380 | A | 7/1996 | Sprankle, Jr. et al. |
| 5,546,356 | A | 8/1996 | Zehner |
| 5,546,362 | A | 8/1996 | Baumann et al. |
| 5,561,641 | A | 10/1996 | Nishimori et al. |
| 5,574,700 | A | 11/1996 | Chapman |
| 5,596,549 | A | 1/1997 | Sheriff |
| 5,596,550 | A | 1/1997 | Rowe, Jr. et al. |
| 5,602,801 | A | 2/1997 | Nussbaum et al. |
| 5,612,928 | A | 3/1997 | Haley et al. |
| 5,623,524 | A | 4/1997 | Weiss et al. |
| 5,675,552 | A | 10/1997 | Hicks et al. |
| 5,694,372 | A | 12/1997 | Perennes |
| 5,790,474 | A | 8/1998 | Feintuch |
| 5,805,525 | A | 9/1998 | Sabol et al. |
| 5,805,528 | A | 9/1998 | Hamada et al. |
| 5,808,967 | A | 9/1998 | Yu et al. |
| 5,838,635 | A | 11/1998 | Masreliez |
| 5,850,372 | A | 12/1998 | Blue |
| 5,930,199 | A | 7/1999 | Wilk |
| 5,991,239 | A | 11/1999 | Fatemi-Booshehri et al. |
| 6,002,644 | A | 12/1999 | Wilk |
| 6,084,827 | A | 7/2000 | Johnson et al. |
| 6,130,641 | A | 10/2000 | Kraeutner et al. |
| 6,215,730 | B1 | 4/2001 | Pinto |
| 6,225,984 | B1 | 5/2001 | Crawford |
| 6,226,227 | B1 | 5/2001 | Lent et al. |
| 6,273,771 | B1 | 8/2001 | Buckley et al. |
| 6,285,628 | B1 | 9/2001 | Kiesel |

(56) References Cited

U.S. PATENT DOCUMENTS

| | | |
|---|---|---|
| 6,321,158 B1 | 11/2001 | DeLorme et al. |
| 6,325,020 B1 | 12/2001 | Guigne et al. |
| 6,335,905 B1 | 1/2002 | Kabel |
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,761,692 B2 | 7/2004 | Angelsen et al. |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,036,451 B1 | 5/2006 | Hutchinson |
| 7,215,599 B2 | 5/2007 | Nishimori et al. |
| 7,236,426 B2 | 6/2007 | Turner et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,305,929 B2 | 12/2007 | MacDonald et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 | 7/2008 | Skjold-Larsen |
| 7,430,461 B1 | 9/2008 | Michaels |
| 7,542,376 B1 | 6/2009 | Thompson et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,019,532 B2 | 9/2011 | Sheha et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,305,841 B2 | 11/2012 | Riordan et al. |
| 8,514,658 B2 | 8/2013 | Maguire |
| 8,605,550 B2 | 12/2013 | Maguire |
| 2001/0026499 A1 | 10/2001 | Inouchi |
| 2002/0035574 A1 | 3/2002 | Dumas |
| 2002/0071029 A1* | 6/2002 | Zell et al. .......................... 348/97 |
| 2002/0085452 A1 | 7/2002 | Scanlon |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1* | 9/2005 | Fisher et al. .................. 707/100 |
| 2006/0002232 A1 | 1/2006 | Shah et al. |
| 2006/0013066 A1 | 1/2006 | Nishimori et al. |
| 2006/0023570 A1* | 2/2006 | Betts et al. ....................... 367/88 |
| 2006/0119585 A1 | 6/2006 | Skinner |
| 2006/0224940 A1 | 10/2006 | Lee |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2007/0208280 A1 | 9/2007 | Talish et al. |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0080082 A1 | 4/2010 | Betts et al. |
| 2010/0097891 A1 | 4/2010 | Cummings |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2010/0277379 A1 | 11/2010 | Lindackers et al. |
| 2011/0007606 A1 | 1/2011 | Curtis |
| 2011/0012773 A1 | 1/2011 | Cunning et al. |
| 2011/0013484 A1* | 1/2011 | Coleman et al. ................. 367/88 |
| 2011/0013485 A1* | 1/2011 | Maguire .......................... 367/88 |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1 | 9/2011 | Soni et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0163126 A1 | 6/2012 | Campbell et al. |
| 2012/0185801 A1 | 7/2012 | Madonna et al. |
| 2013/0007665 A1 | 1/2013 | Chaudhri et al. |
| 2013/0016588 A1 | 1/2013 | O'Dell |
| 2013/0148471 A1 | 6/2013 | Brown et al. |
| 2013/0208568 A1 | 8/2013 | Coleman |
| 2014/0010048 A1 | 1/2014 | Proctor |
| 2014/0064024 A1 | 3/2014 | Maguire |

FOREIGN PATENT DOCUMENTS

| | | |
|---|---|---|
| EP | 1 272 870 B1 | 4/2004 |
| EP | 1 393 025 B1 | 2/2006 |
| EP | 2 070 068 B1 | 3/2008 |
| EP | 2 023 159 A1 | 2/2009 |
| GB | 823304 A | 11/1959 |
| GB | 1 306 769 A | 2/1973 |
| GB | 1 315 651 A | 5/1973 |
| GB | 1316138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| GB | 2 444 161 A | 5/2008 |
| JP | 50-109389 U | 9/1975 |
| JP | 54-054365 U | 4/1979 |
| JP | 57-046173 A | 3/1982 |
| JP | 58-079178 A | 5/1983 |
| JP | S-59-107285 A | 6/1984 |
| JP | S-61-102574 A | 5/1986 |
| JP | 61-116678 A | 6/1986 |
| JP | S-61-262674 A | 11/1986 |
| JP | 62-099877 U | 6/1987 |
| JP | 62-134084 U | 8/1987 |
| JP | 62-190480 A | 8/1987 |
| JP | 63-261181 A | 10/1988 |
| JP | H02-159591 A | 6/1990 |
| JP | H-03-85476 A | 4/1991 |
| JP | 4-357487 A | 12/1992 |
| JP | 4357487 A | 12/1992 |
| JP | 7-031042 A | 1/1995 |
| JP | 07-270523 A | 10/1995 |
| JP | H-10-123247 A | 5/1998 |
| JP | H-10-132930 A | 5/1998 |
| JP | 10-186030 A | 7/1998 |

(56) References Cited

FOREIGN PATENT DOCUMENTS

| | | | |
|---|---|---|---|
| JP | H-10-325871 A | 12/1998 | |
| JP | 2001-74840 A | 3/2001 | |
| JP | 2002-168592 A | 6/2002 | |
| JP | 2004-020276 A | 1/2004 | |
| JP | 2004-219400 A | 8/2004 | |
| JP | 2005-091307 A | 4/2005 | |
| JP | 2006-064524 A | 3/2006 | |
| JP | 2006-162480 A | 6/2006 | |
| JP | 2006-208300 A | 8/2006 | |
| JP | 2008-508539 | 3/2008 | |
| JP | 2008-128900 A | 6/2008 | |
| JP | 2009-222414 A | 10/2009 | |
| JP | 2010-030340 A | 2/2010 | |
| WO | WO 84/01833 A1 | 5/1984 | |
| WO | WO-91/02989 A1 | 3/1991 | |
| WO | WO 98/15846 | 4/1998 | |
| WO | WO 03/009276 A2 | 1/2003 | |
| WO | WO-2005/057234 A1 | 6/2005 | |
| WO | WO-2008/105932 A2 | 9/2008 | |
| WO | WO-2008/152618 A1 | 12/2008 | |
| WO | WO 2011/008429 A1 | 1/2011 | |

OTHER PUBLICATIONS

Garmin; GPSMAP® 4000/5000 Series, Owner's Manual; 2007; 54 pages.
Hare, M.R., "Small-Boat Surveys in Shallow Water", 2008 Institute of Ocean Sciences, Marine habitat mapping Technology for Alaska; 19 pages.
Hayes, M.P. and Ho, T.Y., 2000. "Height estimation of a sonar towfish from sidescan imagery", Hamilton: Proc. Image Vision Computing New Zealand; 6 pages.
Humminbird 1100 Series Operations Manual; © 2007; 196 pages.
Imagenex Technology Corp., Model 881 Digital Tilt Adjust Imaging Sonar; Hardware Specifications; Aug. 12, 2002; 3 pages.
Klein Associates, Inc.; 1985, "Side Scan Sonar Training Manual", Side Scan Sonar Record Interpretation; 151 pages.
Mazel, C. H., 1984 "Inspection of Surfaces by Side-Scan Sonar," ROV '84 Remotely Operated Vehicle Conference of the Marine Technology Society, 7 pages.
Solas Chapter V; Safety of Navigation, Jul. 1, 2002; [Online]; Retrieved from the Internet URL:https://www.gov.uk/government/uploads/system/uploads/attachment_data/file/343175/solas_v_on_safety_of_navigation.pdf.
Tucker, M. J., and Stubbs, A. R., "Narrow-beam echo-ranger for fishery and geological investigations", British Journal of Applied Physics vol. 12:3 pp. 103-110 (1961).
Montgomery, E.T., et al., "Documentation of the U.S. Geological Survey Oceanographic Time-Series Measurement Database", USGS Open-File Report 2007-1194; 2 pages.
Wesmar; 500SS Sidescan Brochure; Feb. 1985; 2 pages.
Wesmar; 500SS Side Scan Brochure; May 1998; 2 pages.
Wesmar; 500SS Side Scan Owner's Manual; 82 pages.
Wesmar; SHD 700SS; "Super High Definition Side Scan Sonar with Color Video Display Capability", Operations Manual, May 1998, 45 pages.
Wesmar; SHD 700SS Super High Definition Side Scan Sonar; date unknown; 4 pages.
Wilson, D., "Side Scan Sonar: The Key to Underwater Survey", Flinders Archaeology Blog, Oct. 25, 2011, 4 pages.
Layton, J., Strickland, J., Bryant, C.W., How Google Earth Works, HowStuffWorks, Mar. 25, 2010, 2 pages; [Online]; Retrieved from Internet URL: http://wayback.archive.org/web/20100425042606/http://computer.howstuffworks.com/internet/basics/google-earth7.htm.
Office Action for European Application No. 10728530.6; dated Apr. 2, 2013.
Office Action for European Application No. 10729001.7; dated Apr. 5, 2013.
Green, J. "Maritime Archaeology: A Technical Handbook". 2nd Edition. Academic Press; May 19, 2004, pp. 1-468.
Humminbird Wide Optic Operations Manual 1997; fish wide open!: 32 pages.
Humminbird Wide Brochure 1997; fish wide open!; 4 pages.
Humminbird 997c SI Combo Installation and Operations Manual 2008; 151 pages.
Humminbird 757c, 787c2 and 757c2i GPS Chartplotter Operations Manual 2006; 161 pages.
Lowrance Electronics, Inc.; X-70A 3D Installation and Operation Instructions; 44 pages.
Raymarine: DSM25 Digital Sounder Module Owner's Handbook; 62 pages.
Raymarine: A65 GPS Chartplotter Owners Handbook; © Raymarine 2006; 100 pages.
Raymarine: E-series Networked Display: Reference Manual; Mar. 2006; 51 pages.
Kongsberg Publication; Pohner, Freddy et al.; Integrating imagery from hull mounted sidescan sonars with multibeam bathymetry: 16 pages.
Airmar Technology Corporation, R209 Dual Frequency 2 to 3W Transducer; Oct. 10, 2007; 2 pages.
Airmar Technology Corporation, R99 Dual Frequency 2kW Transducer; May 2, 2006; 2 pages.
DeRoos, Bradley G. et al., Technical Survey and Evaluation of Underwater Sensors and Remotely Operated Vehicles; May 1993; 324 pages.
Klein Associates, Inc., Klein Hydroscan System, 1983; 52 pages.
Office Action for Japanese Application No. 2013-037874 dated Mar. 26, 2014.
Petition for Inter Partes Review of U.S. Pat. No. 8,305,840; IPR2013-00355; dated Jun. 13, 2013; Raymarine, Inc.; 63 pages.
Declaration of Paul Stokes for Inter Partes Review of U.S. Pat. No. 8,305,840; IPR2013-00355; dated Jun. 12, 2013; Raymarine, Inc.; 118 pages.
Patent Owner's Preliminary Response; Inter Partes Review of U.S. Pat. No. 8,305,840; IPR2013-00355; dated Sep. 17, 2014; Navico Holding AS; 110 pages.
Decision for Inter Partes Review of U.S. Pat. No. 8,305,840; IPR2013-00355; dated Dec. 12, 2013; United States Patent and Trademark Office; 36 pages.
Judgment of Inter Partes Review of U.S. Pat. No. 8,305,840; IPR2013-00355; dated Mar. 25, 2014; United States Patent and Trademark Office; 3 pages.
Petition for Inter Partes Review of U.S. Pat. No. 8,305,840; IPR2013-00496; dated Aug. 6, 2013; Raymarine, Inc.; 63 pages.
Declaration of Paul Stokes for Inter Partes Review of U.S. Pat. No. 8,305,840; IPR2013-00496; dated Aug. 2, 2013; Raymarine, Inc.; 124 pages.
Patent Owner's Preliminary Response; Inter Partes Review of U.S. Pat. No. 8,305,840; IPR2013-00496 ; dated Sep. 17, 2014; Navico Holding AS; 114 pages.
Decision for Inter Partes Review of U.S. Pat. No. 8,305,840; IPR2013-00496; dated Feb. 11, 2014; United States Patent and Trademark Office; 14 pages.
Judgment of Inter Partes Review of U.S. Pat. No. 8,305,840; IPR2013-00496; dated Mar. 25, 2014; United States Patent and Trademark Office; 3 pages.
Petition for Inter Partes Review of U.S. Pat. No. IPR2013-00497; dated Aug. 6, 2013; Raymarine, Inc.; 64 pages.
Declaration of Paul Stokes for Inter Partes Review of U.S. Pat. No. 8,305,840; IPR2013-00497; dated Aug. 2, 2013; Raymarine, Inc.; 166 pages.
Patent Owner's Preliminary Response; Inter Partes Review of U.S. Pat. No. 8,305,840; IPR2013-00497; dated Sep. 17, 2014; Navio Holding AS; 102 pages.
Decision for Inter Partes Review of U.S. Pat. No. 8,305,840; IPR2013-00497; dated Feb. 11, 2014; United States Patent and Trademark Office; 17 pages.
Judgement of Inter Partes Review of U.S. Pat. No. 8,305,840; IPR2013-00497; Mar. 25, 2014; United States Patent and Trademark Office; 3 pages.
Supplemental Response to second set of Interrogatories; International Trade Commission; Investigation No. 337-TA-898; dated Jan. 6, 2014; Raymarine, Inc.; 12 pages.

(56) References Cited

OTHER PUBLICATIONS

Invalidity Contention; U.S. Pat. No. 8,305,840 Invalidity Claim Chart; Exhibit A01—Hydrography; Feb. 12, 2014; 30 pages.
Invalidity Contention; U.S. Pat. No. 8,305,840 Invalidity Claim Chart; Exhibit A02—Hydrography, Lustig; Feb. 12, 2014; 42 pages.
Invalidity Contention; U.S. Pat. No. 8,305,840 Invalidity Claim Chart; Exhibit A03—Hydrography, Adams; Feb. 12, 2014; 49 pages.
Invalidity Contention; U.S. Pat. No. 8,305,840 Invalidity Claim Chart; Exhibit A04—Hydrography, Boucher '522; Feb. 12, 2014; 39 pages.
Invalidity Contention; U.S. Pat. No. 8,305,840 Invalidity Claim Chart; Exhibit A05—Hydrography, Boucher '522, Adams; Feb. 12, 2014; 54 pages.
Invalidity Contention; U.S. Pat. No. 8,305,840 Invalidity Claim Chart; Exhibit A06—Hydrography, Adams, Betts; Feb. 12, 2014; 29 pages.
Invalidity Contention; U.S. Pat. No. 8,305,840 Invalidity Claim Chart; Exhibit A07—Hydrography, Boucher '522, Adam, Betts; Feb. 12, 2014; 33 pages.
Invalidity Contention; U.S. Pat. No. 8,305,840 Invalidity Claim Chart; Exhibit A08—Hydrography, Boucher '798, DeRoos, Adams; Feb. 12, 2014; 46 pages.
Invalidity Contention; U.S. Pat. No. 8,305,840 Invalidity Claim Chart; Exhibit A09—Hydrography, Boucher '798, DeRoos, Adams, Betters; Feb. 12, 2014; 33 pages.
Invalidity Contention; U.S. Pat. No. 8,305,840 Invalidity Claim Chart; Exhibit A10—Furuno; Feb. 12, 2014; 58 pages.
Invalidity Contention; U.S. Pat. No. 8,305,840 Invalidity Claim Chart; Exhibit A11—Airmar P48; Feb. 12, 2014; 70 pages.
Invalidity Contention; U.S. Pat. No. 8,305,840 Invalidity Claim Chart; Exhibit A12—Russell-Cargill et al; Feb. 12, 2014; 89 pages.
Invalidity Contention; U.S. Pat. No. 8,305,840 Invalidity Claim Chart; Exhibit A13—Kongsberg EA 400/600; Feb. 12, 2014; 57 pages.
Invalidity Contention; U.S. Pat. No. 8,305,840 Invalidity Claim Chart; Exhibit A14—Sato; Feb. 12, 2014; 6 pages.
Invalidity Contention; U.S. Pat. No. 8,305,840 Invalidity Claim Chart; Exhibit A15—Chiang, E-Series; Feb. 12, 2014; 5 pages.
Invalidity Contention; U.S. Pat. No. 8,305,840 Invalidity Claim Chart; Exhibit A16—Bird, Wilcox, Nishimori, Hamada, Blue, Fatemi-Boosheri, Boucher '798, Thompson, Betts, Zimmerman, P48, Tri-Beam, Imagenex, Odom Echoscan; Feb. 12, 2014; 40 pages.
Invalidity Contention; U.S. Pat. No. 8,305,840 Invalidity Claim Chart; Exhibit A17—Hydrography, Humminbird 997c, Betts; Feb. 12, 2014; 69 pages.
Invalidity Contention; U.S. Pat. No. 8,305,840 Invalidity Claim Chart; Exhibit A18—Humminbird 997c; Feb. 12, 2014; 83 pages.
Invalidity Contention; U.S. Pat. No. 8,305,840 Invalidity Claim Chart; Exhibit A19—Betts; Feb. 12, 2014; 49 pages.
Invalidity Contention; U.S. Pat. No. 8,300,499 Invalidity Claim Chart; Exhibit B01—Tri-Beam; Feb. 12, 2014; 31 pages.
Invalidity Contention; U.S. Pat. No. 8,300,499 Invalidity Claim Chart; Exhibit B02—Hydrography, Humminbird 757 c; Feb. 12, 2014; 38 pages.
Invalidity Contention; U.S. Pat. No. 8,300,499 Invalidity Claim Chart; Exhibit B03—Airmar-R209, Humminbird 757 c; Feb. 12, 2014; 43 pages.
Invalidity Contention; U.S. Pat. No. 8,300,499 Invalidity Claim Chart; Exhibit B04—Airmar-R209, Hydrography, Humminbird 757c, Sato, Aimar-R99, Zimmerman; Feb. 12, 2014; 59 pages.
Invalidity Contention; U.S. Pat. No. 8,300,499 Invalidity Claim Chart; Exhibit B05—Odom Echoscan; Feb. 12, 2014; 45 pages.
Invalidity Contention; U.S. Pat. No. 8,300,499 Invalidity Claim Chart; Exhibit B06—Kongsberg EA 400/600; Feb. 12, 2014; 37 pages.
Invalidity Contention; U.S. Pat. No. 8,300,499 Invalidity Claim Chart; Exhibit B07—Nishimori, Thompson, Betts, Zimmerman, Melvin, Tri-Beam, Odom Echoscan; Feb. 12, 2014; 22 pages.
Invalidity Contention; U.S. Pat. No. 8,300,499 Invalidity Claim Chart; Exhibit B08—Hydrography, Betts et al, Humminbird 997c and 757c; Feb. 12, 2014; 61 pages.
Invalidity Contention; U.S. Pat. No. 8,300,499 Invalidity Claim Chart; Exhibit B09—Humminbird 997c; Feb. 12, 2014; 40 pages.
Invalidity Contention; U.S. Pat. No. 8,300,499 Invalidity Claim Chart; Exhibit B10—Betts; Feb. 12, 2014; 29 pages.
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67pages.
Office Action for Japanese Application No. 2012-267270 dated Dec. 2, 2013.
Tokuyama, H. et al., *Principles and Applications of Izanagi Oceanfloor Imaging Sonar System*, Journal of the Japan Society of Photogrammetry and Remote Sensing, vol. 29, No. 2, 1990, pp. 76-83.
Yamamoto, F. et al., *Oceanfloor Imaging System—Izanagi*, Journal of the Japan Society for Marine Surveys and Technology 1 (2), Sep. 1989, pp. 45-51, 53 and 54.
Extended European Search Report for Application No. 13153403.4; dated May 7, 2013.
"*Improved sidescan performance on Lowarance LSSI*;" Dr.Depth: Sea bottom mapping software; retrieved on Oct. 5, 2011 from <http:www.dr.depth.se/rdfour.php?1=gb>.
PCT International Search Report and Written Opinion; PCT/IB2013/060285; Feb. 18, 2014.
PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
Search Report for European Application No. 12195752.6; dated Mar. 7, 2013.
Airmar Press Release: *Airmar Introduces P48W 200kHz Adjustable, Wide-Beam, Transom-Mount: Industry's widest 200 kHz transducer can help win fishing tournaments* (Apr. 23, 2009).
Airmar Technology Corporation Brochure/Presentation: Guide to Transducer Technology (Aug. 18, 2010).
Airmar Technology Corporation Datasheet: P48W Transom-Mount Adjustable Wide-Beam, (Dec. 2010).
Owner's Guide & Installation Instructions, Transam or Tolling Motor Mount, Chirp or Adjustable Wide-beam Transducer, Models: P48W, TM130M, TM150M, TM210H (2013).
Airmar Technology Corporation Brochure DST800 Retractable Transducer System Sep. 2005.
Garmin GPSMAP 3206/3210 Color Chartplotter Owner's Manual (Jun. 2006).
GeoAcoustics, GeoSwath Operation Manual Swath 6100/B (Sep. 1998).
GeoAcoustics, GeoSwath Product Bulletin (2000).
Hogarth, P., Low Cost Swath Bathymetry: Widening the swath bathymetry market, Hydro International (Jul. 2000).
Datasheet / Specification for Imagenex Sportscan, (Aug. 2005).
Imagenex Model 858 User's Manual (May 1999).
Imagenex Model 855 User's Manual (Nov. 1991).
Imagenex Sportscan Installation / Setup Manual (date unknown).
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html.
Side Scan PC Operation Manual: SSS-100k PC, SSS-600K PC, SSS-100k/600K PC Side Scan Sonar Operation and Maintenance Manual, JW Fishers MFG Inc (date unknown).
Klein Associates Brochure: Hydroscan for Pipeline Survey (date unknown).

(56) References Cited

OTHER PUBLICATIONS

Klein Associates Brochure: Klein Smartfish, A Proven Platform for Deep Tow Applications (date unknown).
Klein Associates Brochure: System 3900—Dual-Frequency Side Scan Sonar for Search and Recovery (Nov. 2008).
Klein Associates Product Catalog Supplement: Sub-Bottom Profiler & Microprofiler (Supplement to HYDROSCAN catalog) (Nov. 1983).
Klein Hydroscan Applications Bulletin: Oil and Gas Pipeline Routing, Laying and Inspection, (Jan. 1983).
Kucharski, William M., and Clausner, James E., Underwater Inspection of Coastal Structures Using Commercially Available Sonars, Technical Report REMR-CO-11, US Army Corps of Engineers, Department of the Army (Feb. 1990).
Mazel, Charles H., Inspection of Surfaces by Side Scan Sonar, Proceedings of the Remotely Operated Vehicles Conference and Exposition, (1984).
EA 400/600 Sidescan: Echo Sounder with Combined Sidescan and Depth Soundings, Konigsberg Maritime AS, (Nov. 2005).
SIMRAD EK 500 Fishery Research Echo Sounder Installation Manual (Jun. 2006).
SIMRAD EK 500 Fishery Research Echo Sounder Operator Manual (May 1996).
Avera W., et al., Multibeam Bathymetry from a Mine-Hunting Military Sonar, Report No. NRL/JA/7440-02-1010, Naval Research Laboratory and Naval Oceanographic Office, (Nov. 2002).
Barbu, Madalina, "Acoustic Seabed and Target Classification using Fractional Fourier Transform and Time-Frequency Transform Techniques" Dissertation Paper 480, University of New Orleans (2006).
Barbu, C., et al., AQS-20 Sonar Processing Enhancement for Bathymetry Estimation, pp. 1-5, Presented at OCEANS Conference (2005).
Buchanan, H.L. and Lt. Cmdr. John M. Cottingham, Countering Mines in 2005, Sea Technology, vol. 41, No. 1, pp. 24-29, (Jan. 2000).
Elmore, P.A., et al., Environmental Measurements Derived from Tactical Mine Hunting Sonar Data, pp. 1-5, Presented at OCEANS Conference (2007).
Elmore, P.A. et al., Use of the AN/AQS-20A Tactical Mine-hunting System for On-scene Bathymetry Data, Journal of Marine Systems, vol. 78, pp. 5425-5432(Feb. 2008).
Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).
Harris, M.M., et al., Tow Vehicle Depth Verification, Oceans 2002 IEEE/MTS Conference Proceedings, pp. 1199-1202 (Oct. 2002).
Streed, C.A., et al., AQS-20 Through-The-Sensor Environmental Data Sharing, Proceedings of the SPIE Defense & Security Symposium (Mar. 2005).
Taylor, W.A., et al., Taking the Man out of the Minefield, Sea Technology 2007 vol. 48, No. 11, pp. 15-19 (Nov. 2007).
Kelly, D., The Scoop on Scanning Sonar, Motor Boating and Sailing, pp. 51, 70-71 (Aug. 1976).
Sosin, M., Can Electronics Make You Almost as Smart as a Fish, Popular Mechanics, pp. 110-111 (Nov. 1976).
Wesmar Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Denny, M., Blip, Ping, and Buzz, JHU Press, 1st ed. (2007).
Flemming, B.W., M. Klein, P.M. Denbigh, Recent Developments in Side Scan Sonar Techniques, (1982).
Hansen, R.E., Introduction to Sonar, Course Material to INF-GEO4310, University of Oslo, (Oct. 7, 2009).
Kurie, F.N.D. Design and Construction of Crystal Transducers, Office of Scientific Research and Development Washington D C., (1946).
Loeser, Harrison T., Sonar Engineering Handbook, Peninsula Publishing (1992).
Medwin, H. et al., Fundamentals of Acoustical Oceanography, Academic Press (1998).
Miller, S.P., Selected Readings in Bathymetric Swath Mapping, Multibeam Sonar System Design, University of California Santa Barbara (Apr. 1993).
Sherman, C. & J. Butler, Transducers and Arrays for Underwater Sound, Springer Sci. & Bus. Media, 1st ed. (2007).
Stansfield, D., High Frequency Designs, Underwater Electroacoustic Transducers: A Handbook for Users and Designers, Bath University Press and Institute of Acoustics (1991).
Urick, R.J., Principles of Underwater Sound, 3rd Edition, McGraw-Hill Book Company, 1983.
Wilson, O.B., An Introduction to the Theory and Design of Sonar Transducers, Navy Postgraduate School, Monterey, California (Jun. 1985).
Woollett, R.S., Sonar Transducer Fundamentals, Scientific and Engineering Studies, Naval Underwater Systems Center (1984).
Bass, G. New Tools for Undersea Archeology, National Geographic, vol. 134, pp. 403-422 (1968).
Chesterman, W.D., Clynick, P.R., and Stride, A.H., An Acoustic Aid to Sea Bed Survey, Acustica, pp. 285-290, Apr. 1958.
Cyr, Reginald, A Review of Obstacle Avoidance/Search Sonars Suitable for Submersible Applications, Marine Tech. Soc. Journal., vol. 20, No. 4, pp. 47-57(Dec. 1986).
Donovan, D.T., Stride, A.H., and Lloyd, A.J., An Acoustic Survey of the Sea Floor South of Dorset and its Geological Interpretation, Philosophical Transactions of the Royal Society of London, Series B, Biological Sciences, pp. 299-330 (Nov. 1961).
Flemming, B.W., Side-Scan Sonar: A Practical Guide, International Hydrographic, pp. 65-92 (Jan. 1976).
Hersey, J. B, et al., Sonar Uses in Oceanography, Presented at Instrument Automation Conference and Exhibit, New York, NY, Sep. 1960.
Hydro Surveys: Side Scan Sonar Systems, Hydro International (2008).
Morang, Andrew, Kucharski, William M., Side-Scan Investigation of Breakwaters at Calumet and Burns Harbors in Southern Lake Michigan, Oceans 86 Conference Record, pp. 458-465, Sep. 1986.
Newman, P., Durrant-Whyte, H., Using Sonar in Terrain-Aided Underwater Navigation, IEEE Proceedings, (May. 1998).
Noble, N., The Telltale Sound of Depth, Motor Boating and Sailing, pp. 23-24(Aug. 1976).
Pappalardo, M., Directivity Pattern of a Linear Array Transducer in High Frequency Range, Journal de Physique, pp. 32-34 (Nov. 1972).
Patterson, D.R., and J. Pope, Coastal Applications of Side Scan Sonar, Proceedings of Coastal Structures '83, Mar. 1983.
Onoe, M., and Tiersten, H.F., Resonant Frequencies of Finite Piezoelectric Ceramic Vibrators with High Electromechanical Coupling, IEEE Transactions of Ultrasonics Engineering, pp. 32-39 (Jul. 1963).
Rusby, Stuart, A Long Range Side-Scan Sonar for Use in the Deep Sea (Gloria Project) Int. Hydrogr. Rev., pp. 25-39 (1970).
Rossing, Thomas D., Sonofusion??, ECHOES: The Newsletter of the Acoustical Society of America, vol. 12, No. 2 (Spring. 2002).
Somers, M.L., and Stubbs, A.R., Sidescan Sonar, IEE Proceedings, pp. 243-256, Jun. 1984.
Spiess, F.N., Acoustic Imaging, Society of Photo-optical Instrumentation Engineers' Seminar-in-Depth on Underwater Photo-optical Instrumentation Applications, pp. 107-115 (Mar. 1971).
Stride, A.H., A Linear Pattern on the Sea Floor and its Interpretation, National Institute of Oceanography, Wormley, Surrey pp. 313-318 (1959).
Tyce, R.C., Deep Seafloor Mapping Systems A Review, Marine Tech. Soc. Journal., vol. 20, No. 4, pp. 4-16 (Dec. 1986).
Wang, H.S.C., Amplitude Shading of Sonar Transducer Arrays, The Journal of the Acoustical Society of America, pp. 1076-1084, (May 1975).
Benthien, George W, and Hobbs, Stephen, Technical Report: Modeling of Sonar Transducers and Arrays, Sep. 2005.
Barnum, S.R. CDR, Descriptive Report to Accompany Hydrographic Survey Side, Scan Sonar / Multibeam Survey of Portsmouth Harbor, Survey No. H11014 (2001).
Clausner, J. Coastal Engineering Technical Note: Side Scan Sonar for Inspecting Coastal Structures, CETN-III-16, U.S. Army Engineer Waterways Experiment Station, (Nov. 1983).

(56) References Cited

OTHER PUBLICATIONS

Craig, J.D., Engineering and Design: Evaluation and Repair of Concrete Structures, Manual No. 1110-02-2002, US Army Corps of Engineers, Department of the Army (Jun. 1995).
McMillan, Ken, The Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).
Ronhovde, A., High Resolution Beamforming of Simrad EM3000 Bathymetric Multibeam Sonar Data, Cand Scient thesis, University of Oslo, Norway. (Oct. 1999).
Speiss, F.N., and Tyce, R.C., Marine Physical Laboratory Deep Tow Instrumentation System, Deep Submergence Systems Project and Office of Naval Research, Report No. MPL-U-69/72, (Mar. 1973).
Williams, S. Jeffress, Use of High Resolution Seismic Reflection and Side-Scan Sonar Equipment for Offshore Surveys, CETA 82-5, U.S. Army Corps of Engineers Coastal Engineering Research Center (Nov. 1982).
EdgeTech 2000-CSS Integrated Coastal System Subscan Brochure (date unknown).
HyPack Inc,: HyPack Software User Manual (date unknown).
L-3 Communications SeaBeam Instruments Technical Reference: Multibeam Sonar Theory of Operation, (2000).
QPS b.v.,: Qinsy User Manual (Apr. 27, 2004).
SIMRAD Kongsberg EM Series Multibeam Echo Sounder Operators Manual (2000).
Tritech Technical Data Sheet: ROV/AUV Side Scan—Sea King Side Scan Sonar (date unknown).
Tritech Manual: Starfish Hull Mount Sonar System User Guide (date unknown).
Triton Elics Intl.: ISIS Sonar® User's Manual, vols. 1 and 2 (Jun. 2004).
Vernitron Product Catalog: Modern Piezoelectric Ceramics, Custom Material Product Catalog (date unknown).
Oceanic Imaging Consultants (OIC) Inc.: GeoDAS SDV Geophysical Data Acquisition System Brochure.
SonarWeb Pro [retrieved Feb. 10, 2015]. Via the Internet Archive Wayback Machine at https://web.archive.org/web/20090622013837/http://chesapeaketech.com/prod-webpro.html (Jun. 22, 2009). 4 pages.
Feature Matrix—SonarTRX/-Si/-LSS Sidescan sonar processing software (Version 13.1—Feb. 20, 2013) [retrieved Feb. 10, 2015]. Retrieved from the Internet: http://www.sonartrx.com/Documents/SonarTRX-FeatureMatrix-1301.pdf (dated Feb. 10, 2015). 2 pages.
Anderson, K.; "Side-Scanning for Sport Fishing"; Salt Water Sportsman; Apr. 1, 2009; 4 pages.
Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.
Armstrong, A.A., et al.; "New Technology for Shallow Water Hydrographic Surveys"; Proceedings of the $25^{th}$ Joint Meeting of UJNR Sea-bottom Surveys Panel; Dec., 1996.
Asplin, R.G., et al.; "A new Generation Side Scan Sonar"; OCEANS '88 Proceedings. 'A Partnership of Marine Interests'; vol. 2; Oct.-Nov. 1988; pp. 329-334.
Australian Government, Department of Sustainability, Environment, Water, Population and Communities; Fact Sheet—The RV Tangaroa; date unknown; 3 pages.
Baker, N., et al, "Rifting History of the Northern Mariana Trough. SeaMARCH II and Seismic Reflection Surveys," Journals of Geophysical Research, vol. 101, No. B5, May 10, 1996.
Ballantyne, J.; "Find and Catch More Fish, Quickly and Easily, with the Fishin' Buddy 2255"; [Online]; [Retrieved on Dec. 7, 2011]; Retrieved from the Internet URL:<http://www.articleslash.net/Recreation-and-Sports/Fishing/67018_Find-and-Catch-More-Fish-Quickly-and-Easily-with-the-FISHIN-BUDDY-2255.html>; 4 pages.
Blondel, Philippe; The Handbook of Sidescan Sonar; © 2009; 316 pages.
Calcutt, Ron; Lowrance Book of Sonar & GPS; © 1986; and Lowrance Book of Sonar & GPS Update; 1997; collectively 122 pages.
Carey, W.M., "Sonar Array Characterization, Experimental Results"; IEEE Journal of Oceanic Engineering ; vol. 23; Issue 3; Jul. 1998; pp. 297-306.
Cowie, P.A., et al., "Quantitative Fault Studies on the East Pacific Rise: A Comparison of Sonar Imaging Techniques," Journal of Geophysical Research, vol. 99, B8, Aug. 10, 1994.
Curcio, J., et al.; "SCOUT—A Low Cost Autonomous Surface Platform for Research in Cooperative Autonomy"; Department of Mechanical Engineering; Massachusetts Institute of Technology; Aug. 2005.
Derrow, II, Robert W. et al., A Narrow-Beam, Side-Looking Sonar for Observing and Counting Fish in Shallow Aquaculture Ponds; 1996; 34 pages.
Farrell, E.J.;, "Color Display and Interactive Interpretation of Three-Dimensional Data"; IBM Jurnal of Research and Development; vol. 27; No. 4; Jul. 1983; pp. 356-366.
Glynn, Jr., J.M., et al.; "Survey Operations and Results Using a Klein 5410 Bathymetric Sidescan Sonar"; Retrieved from the Internet URL:<http://www.thsoa.org/hy07/03_04.pdf>; Mar. 2007.
Hansen, H.H.; "Circular vs. rectangular transducers"; Department of Electronics and Telecommunications; Norwegian University of Science and Technolgy; Mar. 2010; 28 pages.
Hughes Clarke, J. E., et al.; Knudsen 320 200 kHz keel-mounted sidescan trials; Results from 2000/2001/2002 field operations; [online]; Retrieved on Jun. 23, 2010 from the Internet URL: <http://www.omg.unb.ca/Ksidescan/K320_SStrials.html>; 11 pages.
Hughes Clarke, J.E.; "Seafloor Characterization using keel-mounted sidescan: proper compensation for radiometric and geometric distortion"; Canadian Hydrographic Conference; May 2004; 18 pages.
Hussong, D.M., et al., "High-Resolution Acoustic Seafloor Maping," $20^{th}$ Annual OTC, Houston, TX, May 2-5, 1988.
Jonsson, J., et al. "Simulation and Evaluation of Small High-Frequency Side-Scan Sonars using COMSOL"; Excerpt from the Proceedings of the COMSOL Conference; 2009; Milan, Italy.
Key, W.H.; "Side Scan Sonar Technology"; Oceans 2000 MTS/IEEE Conference and Exhibition; vol. 2; Sep. 2000; pp. 1029-1033.
Kielczynski, P., et al.; "Finite Element Method (FEM) and Impulse Response Method (IRM) analysis of circular and rectangular transducers"; 1995 IEEE Ultrasonics Symposium; 1995; pp. 693-696.
Klein, Martin; New Capabilities of Side Scan Sonar Systems; date unknown; pp. 142-147.
Klein, Martin; New Developments in Side Scan Sonar for Hydrography; date unknown; 14 pages.
Klein, Martin; Sea Floor Investigations Using Hybrid Analog/Digital Side Scan Sonar; date unknown; 18 pages.
Klein, Martin; Side Scan Sonar; Offshore Services; Apr. 1977, pp. 67, 68, 71, 72, 75.
Klein, Martin; Side Scan Sonar; UnderSea Technology; Apr. 1967; 4 pages.
Klein, M. et al., Sonar—a modern technique for ocean exploitation; IEEE Spectrum; Jun. 1968; pp. 40-46 and Authors page.
Kozak, G.; "Side Scan Sonar Target Comparative Techniques for Port Security and MCM Q-Route Requirements"; L-3 Communications; Klein Associates, Inc.; [Online]; Retrieved from the Internet URL: <http://www.chesapeaketech.com/techniques-port-security.pdf>; 11 pages.
Krotser, D.J., et al.; "Side-Scan Sonar: Selective Textural Enhancement"; Oceans'76; Washington, DC; Sep. 1976.
Kvitek, Rikk et al.; Final Report, Early Implementation of Nearshore Ecosystem Database Project Tasks 2 and 3; <http://seafloor.csumb.edu/taskforce/html%202%20web/finalreport.htm>; Jul. 29, 1999; 92 pages.
Kvitek, R.G., et al.; "Victoria Land Latitudinal Gradient Project: Benthic Marine Habitat Characterization"; California State University; Monterey Bay; Field Report; Feb. 25, 2004.
Langeraar, W.; "Surveying and Charting of the Seas"; Elsevier Oceanography Series; vol. 37; Sep. 1983; p. 321.

(56) References Cited

OTHER PUBLICATIONS

Law, G., Sideways Glance, Side- and down-scan Imaging Open New Windows in Fishing Finding, Electronics, Nov. 2011, pp. 28-29.
Leonard, John L.; Cooperative Autonomous Mobile Robots; date unknown; 11 pages.
Manley, J.E., et al.; "Development of the Autonomous Surface Craft 'Aces'"; Oceans '97 MTS/IEEE Conference Proceedings; Oct. 1997; pp. 827-832.
Manley, J.E., et al.; "Evolution of the Autonomous Surface Craft 'AutoCat'"; Oceans 2000 MTS/IEEE Conference and Exhibition; vol. 1; Sep. 2000; pp. 403-408.
Melvin, G., et al.; Commercial fishing vessels, automatic acoustic logging systems and 3D data visualization; ICES; Journal of Marine Science; vol. 59; Issue 1; 2002; pp. 179-189.
Newman, P.M.; "MOOS-Mission Orientated Operating Suite"; Department of Ocean Engineering; Massachusetts Institute of Technology; 2002.
Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.
Oughterson, B., Sophisticated Sonar Reveals Detailed Images Recently Unimaginable. Is It Too Much too Soon?, Basic Instincts, pp. 75-78.
Prickett, T.; "Underwater Inspection of Coastal Structures"; The REMR Bulletin; vol. 14; No. 2; Aug. 1997.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
Russell-Cargill, W.G.A. ed.; Recent Developments in Side Scan Sonar Techniques; © 1982; 141 pages.
Shono, K., et al.; "Integrated Hydro-Acoustic Survey Scheme for Mapping of Sea Bottom Ecology"; Ocean Research Institute; Tokyo, Japan; Nov. 2004.
Trabant, Peter K.; Applied High-Resolution Geophysical Methods, Offshore Geoengineering Hazards; © 1984; 265 pages.
Trevorrow, M.V., et al.; "Description and Evaluation of a Four-Channel, Coherent 100-kHz Sidescan Sonar"; Defence R&D Canada-Atlantic; Dec. 2004.
Tritech International Limited; StarFish; 450H Hull-Mounted Sidescan System; date unknown; 2 pages.
Universal Sonar Limited; High Frequency Broad Band Line Array Type G27/300LQ; date unknown 2 pages.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; pp. 329-334.
Waite, A.D.; "Sonar for Practising Engineers"; Third Edition; John Wiley & Sons, Ltd.; West Sussex, England; © 2002; 323 pages.
Williams, J. P., *Glancing Sideways, Nautical Know-How*, Chesapeake Bay Magazine, May 2011, pp. 14-17.
Alpine Geophysical Data Programmer Model 485C Brochure and letter dated Feb. 17, 1976; 2 pages.
Benthos C3D Sonar Imaging System; "High Resolution Side Scan Imagery with Bathymetry"; Benthos, Inc.; © May 2002.
Coastal Engineering Technical Note; "Side-Scan Sonar for Inspecting Coastal Structures"; U.S. Army Engineer Waterways Experiment Station; Revised Nov. 1983.
ConCAT Containerised Catamaran; Inshore hydrographic survey vessel that fits in a container; In Cooperation with Uniteam International; Kongsberg Simrad AS; Apr. 2004.
Communication [extended European Search Report] for European Application No. 05782717.2-2220 dated Aug. 31, 2011; 12 pages.
Communication for European Patent Application No. 05782717.2-2220 dated May 11, 2012; 9 pages.
Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.
Deep Vision Side Scan Sonar Systems; [Online]; [Retrieved on Dec. 2, 2011]; Retrieved from the Internet URL:<http://www.deepvision.se/products.htm>; 5 pages.
Detailed Sonar Transducer Product Information; Transducer Products; Side Scans; Models T36, T63, T62, and T403; Dec. 30, 2003; Retrieved from internet: URL: <http://www.neptune-sonar.com/products.as_btype=Side-Scan+Transducers&category=>; 4 pages.
DSME E&R Ltd.; Remotely Operated Sonar Boat System (SB-100S); <http://dsmeu.en.ec21.com/Remotely_Operated_Sonar_Boat_System-618904_2479905.html>;printed on Feb. 12, 2010; 3 pages.
Eagle Electronics; Ultra 3D Installation and Operation Manual; © 2002; 24 pages.
Edo Corporation Global Technology Reach, Model 6400 Fan Beam Transducer; <http:/web/archive/org/web/20040608054923/www.edoceramic.con/NavDucers.htm>; Jun. 3, 2004.
EM1110-2-1003; Department of the Army; U.S. Army Corps of Engineers; Engineering and Design; Hydrographic Surveying; Apr. 1, 2004.
File Wrapper of Provisional U.S. Appl. No. 60/552,769, filed Mar. 12, 2004; Applicant: Terrence Schoreder.
Final Report; Early Implementation of Nearshore Ecosystem Database Project Tasks 2 and 3; [online]; Retrieved on Feb. 26, 2010 from the Internet URL: <http://seafloor.csumb.edu/taskforce/html%202%20web/finalreport.htm>; 90 pages.
Fishin' Buddy 4200™ Operations Manual; Dated Dec. 21, 2005; 16 pages.
FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.
Fishing Tool Reviews—Bottom Line Fishin Buddy 1200 Fishfinder; [Online]; [Retrieved on Dec. 7, 2011]; Retrieved from the Internet URL:<http://www.tackletour.com/reviewbottomline1200.html>; 4 pages.
Furuno Electric Co., Ltd.; Side Looking Sonar, Model SL-16, 1983; 4 pages.
Geoacoustics; GeoPulse, Profiler System; Feb. 2006, 2 pages.
GeoAcoustics; A Kongsberg Company; GeoSwath Plus Brochure; "Wide swath bathymetry and georeferenced side scan"; [Online]; Retrieved from the internet URL: <http://www.km.kongsberg.com/ks/web/nokbg0397.nsf/AllWeb/F4B7FD3461368388C1257599002D34BC/$file/GeoSwath-Plus-brochure.pdf?OpenElement>.
GeoPulse; GeoAcoustics Pinger Sub-Bottom Profiler; Retrieved from the Internet URL:<http://www.km.kongsberg.com/ks/web/nokbg0397.nsf/AllWeb/D1084BB7DDOFD21DC12574C0003E01EA/$file/GeoPulse_Profiler.pdf?OpenElement,>; GeoAcoustics Limited, UK; A Kongsberg Company.
GlobalMap Sport; Installation and Operation Instructions; Lowrance Electronics, Inc.; © 1996; 61 pages.
GPS Speed Correction; Sidescan Sonar; [online]; Retrieved from the Internet URL: <www.hydrakula.uni-kiel.de/downloads/Sidescan%20Sonar.doc>; 10 pages.
Humminbird 100 Series™ Fishin' Buddy®; 110, 120, 130 and 140c Product Manual; © 2007; 2 pages.
Humminbird 1197c Operations Manual; Nov. 6, 2007; 196 pages.
Humminbird 1198C Review for Catfishing, Catfishing "How to" Catfishing Techniques, Oct. 31, 2011, 9 pages.
Humminbird 200DX Dual Beam Operations Manual; 43 pages.
Humminbird 500 Series; 550, 560, 570 and 570 DI Operations Manual; © 2010; pp. 84.
Humminbird: America's favorite Fishfinder—the leading innovator of Side Imaging technology; [Online]; [Retrieved on Mar. 16, 2011]; Retrieved from the Internet URL: <http://www.humminbird.com/support/ProductManuals.aspx>; 20 pages.

(56) References Cited

OTHER PUBLICATIONS

Humminbird Dimension 3 Sonar 600 Operations Manual; 24 pages.
The Humminbird GPS Navigational System. Nothing Else Even Close.; Humminbird Marine Information Systems®; 1992; 10 pages.
Humminbird GPS NS 10 Operations Manual; 75 pages.
Humminbird High Speed Transducer; 4 pages.
Humminbird LCR 400 ID Operations Manual; 28 pages.
Humminbird Marine Information Systems; Dimension 3 Sonar™; 1992; 16 pages.
Humminbird "Matrix 35 Fishing System," Prior to Aug. 2, 2003.
Humminbird Matrix 35 Fishing System; 2 pages.
Humminbird Matrix 55 and 65 Operations Manual; © 2003; 40 pages.
Humminbird Matrix 67 GPS Trackplotter Operations Manual; © 2003; 88 pages.
Humminbird "Matrix 97 GPS Trackplotter Operations Manual" 2003.
Humminbird Matrix 97 Operations Manual; © 2003; 87 pages.
Humminbird Matrix# 87c Operations Manual; © 2004; 45 pages.
Humminbird The New Wave of Wide; 1997; HUMMINBIRD WIDE®; fish wide open!®; 24 pages.
Humminbird NS25 Operations Manual; 71 pages.
Humminbird Piranha 1 & 2 Operation Guide; 5 pages.
Humminbird Platinum ID 120 Operations Manual; 36 pages.
Humminbird Platinum ID 600 Operations Manual; 18 pages.
Humminbird "The Product Line>Matrix Products>Matrix 35" <http://web.archive.org/web/20030404000447/www.humminbird.com/hb_Products.asp?ID>, Apr. 4, 2003.
Humminbird® Trolling Motor Mounted Transducer with Mount Assembly Brochure; © 2008 Humminbird®, Eufaula, AL; 2 pages.
Humminbird Wide 3D Paramount Operations Manual; 44 pages.
Humminbird Wide 3D View Operations Manual; 38 pages.
Humminbird Wide 3D Vision Operations Manual; 38 pages.
Humminbird Wide 3D Vista Operations Manual; 38 pages.
Humminbird Wide Eye Operations Manual; 32 pages.
Humminbird Wide Paramount Operations Manual; fish wide open!; 32 pages.
Humminbird "Wideside"; Schematic; Dec. 15, 1994; 5 pages.
Hydro Products; A Tetra Tech Company; 4000 Series Gifft Precision Depth Recorder Product Brochure; date stamped 1977.
The Hydrographic Society—Corporate Member News—Kongsberg Simrad; Jul. 3, 2008; 7 pages.
Imagenex Model 855 Brochure: Online; Documents retrieved from internet web archives as follows: URL:<http://web.archive.org/web/20021023212210/http:/www.imagenex.com/Products/855_858/855_858.html>; 1 page; Archived on Oct. 23, 2002 URL:http://web.archive.org/web/20021024124035/http:/www.imagenex.com/Products/855_858/855/855.html; 1 page; Archived on Oct. 24, 2002 URL:<http://web.archive.org/web/20021024125254/http:/www.imagenex.com/Products/855_858/858/858.html>; 1 page; Archived on Oct. 24, 2002 URL:<http://web.archive.org/web/20030424071306/http:/www.imagenex.com//855_Page_1.jpg>; 1 page; Archived on Apr. 24, 2003 URL:<http://web.archive.org/web/20030424091547/http:/www.imagenex.com/855_Page_2.jpg>; 1 page; Archived on Apr. 24, 2003 URL:<http://web.archive.org/web/20030424094158/http:/www. imagenex.com/855_Page_3.jpg>; 1 page; Archived on Apr. 24, 2003 URL:<http://web.archive.org/web/20030424101301/http:/www.imagenex.com/855_Page_4.jpg>; 1 page; Archived on Apr. 24, 2003 URL:<http://web.archive.org/web/20030424101939/http:/www.imagenex.com/855_Page_5.jpg>; 1 page; Archived on Apr. 24, 2003 URL:<http://web.archive.org/web/20030424135458/http:/www.imagenex.com/855_Page_6.jpg>; 1 page; Archived on Apr. 24, 2003 URL:<http://web.archive.org/web/20030424141232/http:/www.imagenex.com/855_Page_7.jpg>; 1 page; Archived on Apr. 24, 2003 URL:<http://web.archive.org/web/20030424143158/http:/www.imagenex.com/855_Page_8.jpg>; 1 page; Archived on Apr. 24, 2003.
Imagenex Model 872 "Yellowfin" Sidescan Sonar; Imagenex Technology Corp.; © 2004-2009; 107 pages.
The Imagenex SportScan; Digital Sidescan Sonar; "Redefining Image Clarity"; Imagenex Technology Corp.; © 2002; 4 pages.
Imagenex SportScan Digital SideScan Sonar Brochure: Online; Documents retrieved from internet web archives as follows: URL:<http://web.archive.org/web/20030212030409/http://www.imagenex.com/Products/products.html>; 1 page; Archived on Feb. 12, 2003 URL:<http://web.archive.org/web/20030214044915/http://www.imagenex.com/Products/SportScan/sportscan.html>; 1 page; Archived on Feb. 14, 2003 URL:<http://web.archive.org/web/20030222152337/http://www.imagenex.com/Products/SportScan/SportScan_Specs/sportscan_specs.html>; 3 pages; Archived on Feb. 22, 2003 URL:<http://web.archive.org/web/20030222161450/http://www.imagenex.com/Products/SportScan/FAQ_s/faq_s.html>; 4 pages; Archived on Feb. 22, 2003 URL:<http://web.archive.org/web/20030419024526/http://www.imagenex.com/Products/SportScan/distributors.html>; 2 page; Archived on Apr. 19, 2003.
Imagenex (Various) Technical Specifications and User's Manual; Prior to Aug. 2003; 3 pages.
Imagenex Technology Corp., Model 881 SportScan, Single or Dual Frequency Digital Sidescan Sonar, Software User's Manual; May 9, 2003; 16 pages.
Imagenex Technology Corp.; YellowFin SideScan Sonar, (Model 872); user's manual; data storage file format; Ethernet interface specification, and Ethernet setup guide; Nov. 2004; 46 pages.
Innomar—Products; "System Variants: SES Side Scan Option"; Retrieved from internet URL:<http://www.innomar.com/produ_2000sidescan.htm>; Dec. 30, 2003; 2 pages.
International Search Report for Application No. PCT/US05/27436 dated Nov. 20, 2007; 1 page.
International Preliminary Report on Patentability for Application No. PCT/US05/27436 dated Dec. 6, 2007; 5 pages.
International Search Report and Written Opinion for Application No. PCT/US2010/039441 dated Oct. 11, 2010.
International Search Report and Written Opinion for Application No. PCT/US2010/039443 dated Oct. 6, 2010.
"ITC Application Equations for Underwater Sound Transducers"; Published by International Transducer Corporation, 1995, Rev. 8/00; 3 pages.
Kelvin Hughes Transit Sonar; ". . . a new dimension in shallow water survey to assist in . . . "; Hydrography; Dredging; Salvage; Underwater Construction and Similar Works; Mar. 1966; 8 pages.
Klein Associates, Inc.; Modular Side Scan Sonar and Sub-Bottom Profiler System Components for Customized Configurations; date unknown; 10 pages.
Klein Digital Sonar Systems, ". . . The Next Generation From the World Leader in Side Scan Sonar and Sub-bottom Profiling Systems," 1988; 11 pages.
Kongsberg Brochure EA 400 Survey; "A complete, integrated survey system"; Kongsberg Maritime AS; Oct. 2003; 4 pages.
Kongsberg Brochure EA 400/600 "Sidescan Echo sounder with combined sidescan and depth soundings"; Kongsberg Maritime AS; May 2004; 3 pages.
Kongsberg Maritime AS; Side Looking Transducer, 200 kHz—0.5x49, 200 kHz side looking transducer for shallow water and surveying and high resolution; date unknown; 2 pages.
Kongsberg Simrad AS; ConCat Containerised Catamaran, Inshore hydrographic survey vessel that fits in a container, Rev. B, Apr. 2004; 4 pages.
Lowrance HS-3DWN Transducer Assembly and Housing (Eagle IIID); Aug. 1994; 6 pages.
Lowrance LCX-18C & LCX-19C Fish-finding Sonar & Mapping GPS; Operation Instructions; © 2002; 200 pages.
Lowrance Transducers Product Information; 1 page.
Marine Acoustics Society of Japan, Ed.; "Basics and Application of Marine Acoustics"; Apr. 28, 2004; pp. 152-172.
Maritime surveys takes delivery of SeaBat 8160; Sea Technology, Jul. 2001; <http://findarticles.com/p/articles/mi_qa5367/is_200107/ai_n21475675/>; website printed Jun. 30, 2010.
Marine Sonic Technology, Ltd.; Sea Scan® PC Side Scan Sonar System Information/Specifications Sheet; Sep. 9, 2002; 10 pages.
Mesotech; Mesotech Model 971 Sonar System Summary; Mar. 26, 1985, 2 pages.

(56) References Cited

OTHER PUBLICATIONS

Navico Design Report of Raytheon Electronics Side Looker Transducer; Mar. 12, 2010; 18 pages.
NOAA: Nautical Charting general information from public records; [Online]; Retrieved on Sep. 10, 2010 from the Internet URL: <http://www.nauticalcharts.noaa.gov/csdl/learn_hydroequip.html>; 2 pages; <http://www.nauticalcharts.noaa.gov/csdl/learn_hydroequip.html>; 1 page; <http://www.nauticalcharts.noaa.gov/csdl/PDBS.html>; 2 pages; <http://www.nauticalcharts.noaa.gov/hsd/pub.html>; 1 page; <http://www.nauticalcharts.noaa.gov/hsd/fpm/fpm.htm>; 1 page; <http://www.ozcoasts.gov.au/geom_geol/toolkit/Tech_CA_sss.jsp>; 12 pages.
Office Action for Reexamination U.S. Appl. No. 90/009,956; dated Apr. 6, 2012; 32 pages.
Office Action for Reexamination U.S. Appl. No. 90/009,957; dated Jun. 4, 2012; 17 pages.
Office Action for Reexamination U.S. Appl. No. 90/009,958; dated Jun. 18, 2012; 19 pages.
Office Action for U.S. Appl. No. 11/195,107; dated Feb. 15. 2007; 5 pages.
Office Action for U.S. Appl. No. 11/195,107; dated Aug. 9, 2007; 7 pages.
Office Action for U.S. Appl. No. 11/195,107; dated Mar. 4, 2008; 7 pages.
Office Action for U.S. Appl. No. 11/195,107; dated Jul. 17, 2008; 7 pages.
Office Action for U.S. Appl. No. 11/195,107; dated May 12, 2009; 9 pages.
Office Action for U.S. Appl. No. 12/319,594; dated Jun. 8, 2009; 10 pages.
Office Action for U.S. Appl. No. 12/319,586; dated Sep. 3, 2009; 5 pages.
Office Action for U.S. Appl. No. 12/319,586; dated Mar. 2, 2010; 5 pages.
Office Action for U.S. Appl. No. 12/319,604; dated Sep. 29, 2009; 7 pages.
Office Action for U.S. Appl. No. 12/631,229; dated Sep. 9, 2010, 8 pages.
ONR Grant N66604-05-1-2983; Final Report; "Cooperative Autonomous Mobile Robots"; Retrieved from the Internet URL: <http://dodreports.com/pdf/ada463215.pdf>; Post 2006.
Odom Echoscan™: For Sea Floor or Riverbed Surveys; Odom Hydrographic Systems; Apr. 26, 2002; 2 pages.
Odom Hydrographic Systems ECHOSCAN Manual; Revision 1.11; Apr. 26, 2002.
"Product Survey Side-Scan Sonar"; Hydro International Magazine; vol. 36; Apr. 2004; pp. 36-39.
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
Raymarine, L750 Fishfinder, Operation Handbook; date unknown; 93 pages.
Raytheon Marine Company; Installation Instructions; Oct. 1998; 2 pages.
Remtechsroy Group; Side Scan Sonar-Remotely Operated Vehicle Surface; <http://remtechnology.en.ec21.com/Side_Scan_Sonar_Remotely_Operated-2902034_2902230.html>; printed on Feb. 12, 2010; 4 pages.
RESON Inc.; SeaBat 8101 Product Specification, 240kHz Multibeam Echo Sounder; © 1999; 2 pages.
RESON; SeaBat 8101; Multibeam acoustic echosounder; date unknown; 1 page.
RESON; SeaBat 8160 Product Specification, Multibeam Echosounder System; date unknown; 2 pages.
Response to European Search Report for European Patent Application No. 05782717.2-2220; dated Mar. 23, 2012; Johnson Outdoors, Inc.; 35 pages.
SeaBat 8101 Product Specification; 240kHz Multibeam Echo Sounder; © 1999 RESON Inc.; Version 4.0; 6 pages.
Sidefinder—Reviews & Brand Information—Techsonic Industries, Inc.; [Online]; [Retrieved on Dec. 7, 2011]; Retrieved from the Internet URL:<http://www.trademarkia.com/sidefinder-74113182.html>; 3 pages.
Simrad; Product Specifications, Simrad EA 500 Side-looking Option; Feb. 1992, 1 page.
Simrad EA 500; Hydrographic Echo Sounder; Product Specifications; Revision: Sep. 1993.
SonarBeam Underwater Surveying System Using T-150P tow-fish hull mounted; [Online]; [Retrieved on Feb. 12, 2010 from the Internet URL: <http://dsmeu.en.ec21.com/Remotely_Operated_Sonar_Boat_System--618904_2479905.html>; 4 pages; <http://www.remtechnology.en.ec21.com/Side_Scan_$_{Sonar}$_Remotely_Operated--2902034.html>; 4 pages; [Retrieved on Feb. 16, 2010 from the Internet URL: <http://dsmeu.en.ec21.com/Remotely_Operated_Sonar_Boat_System--618904_2479905.html>; 4 pages; <http://www.remtechnology.en.ec21.com/Side_Scan_Sonar_Remotely_Operated--2902230.html>; 7 pages.
Sonar Theory and Applications; Excerpt from Imagenex Model 855 Color Imaging Sonar User's Manual; Imagenex Technology Corp.; Canada; 8 pages.
Starfish 450H; Sidescan System; Tritech International Limited; UK.
T297-00-01-01 Transducer housing outline drawing; Neptune Sonar Ltd.; © 2002.
Techsonic Industries, Inc., Humminbird Wide fish wide open!; brochure, 1997; 4 pages.
Techsonic Industries, Inc.; Humminbird GPS brochure; © 1992; 10 pages.
Techsonic Industries, Inc.; "Mask, Acoustic"; Schematic, May 24, 1996.
Techsonic Industries, Inc.; "Element, 455 kHz"; Schematic, Jun. 13, 1996.
Teleflex Electronic Systems; Humminbird 1997; © 1996; 24 pages.
The Norwegian and Finnish navies performing operations with the Kongsberg Hugin AUV and minesniper mine disposal vehicle in Finnish waters; FFU nytt; No. 3, Nov. 2003; p. 12.
Trademark Electronic Search System (TESS); Word Mark: Sidefinder; [Online]; [Retrieved on Dec. 7, 2011]; Retrieved from the Internet URL:<http://tess2.uspto.gov/bin/showfield?f=doc&state=4009:qi4jkj.2.1>; 2 pages.
"Transducers Quad Beam," Prior to Aug. 2, 2003; 1 page.
Translation of Notice of Reason(s) for Rejection for Japanese Application No. 2007-524919 dated Aug. 16, 2011; 4 pages.
U-Tech Company Newsletter; 1 page.
Ultra III 3D Installation and Operation Instructions; EAGLE™; © 1994.
USACE, "Chapter 11, Acoustic Multibeam Survey Systems for Deep-Draft Navigation Projects," Apr. 1, 2004.
Westinghouse Publication; "Side-Scan Sonar Swiftly Surveys Subsurface Shellfish"; May 1970; 4 pages.
International Search Report and Written Opinion for Application No. PCT/US2012/046062 dated Dec. 14, 2012.
De Jong, C. D., et al.; "*Hydrography: Series on Mathematical Geodesy and Positioning*;" VSSD; ISBN 90-407-2359-1; dated 2002.
Berktay, H. O., et al.; "*Farfield performance of parametric transmitters*;" Journal of Acoustical Society of America, vol. 55, No. 3; dated Mar. 1974.
Fried, N. W.; "*An Investigation of a Large Step-Down Ratio Parametric Sonar and Its Use in Sub-Bottom Profiling*;" Thesis: Simon Fraser University; dated Aug. 1992.
Hardiman, J. E., et al.; "*High Repetition Rate Side Looking Sonar*;" Oceans 2002 MTSIEEE, vol. 4; dated Oct. 2002.
Naoi, J., et al.; "*Sea Trial Results of a Cross Fan Beam Type Sub-Bottom Profiler*;"Japanese Journal of Applied Physics, vol. 39, No. 5; dated May 2000.
Plueddemann, A. J., et al.; "*Design and Performance of a Self-Contained Fan-Beam ADCP*;" IEEE Journal of Oceanic Engineering, vol. 26, No. 2; dated Apr. 2001.
Riordan, J., et al.; "*Implementation and Application of a Real-time Sidescan Sonar Simulator*;" Oceans 2005—Europe, vol. 2; dated Jun. 2005.
Yang, L., et al.; "*Bottom Detection for Multibeam Sonars with Active Contours*;" MTSIEEE Conference Proceedings, vol. 2; dated Oct. 1997.
"*100 W adjustable Wide-Beam: Transom-Mount Transducer—P48W*;" Airmar Technology Corporation; <www.airmar.com>.

\* cited by examiner

FIG. 8A.
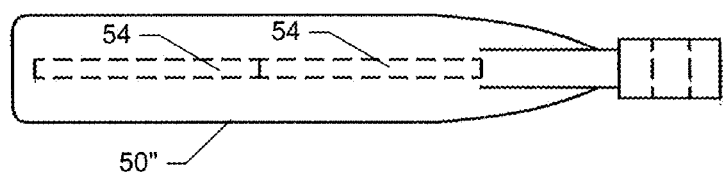
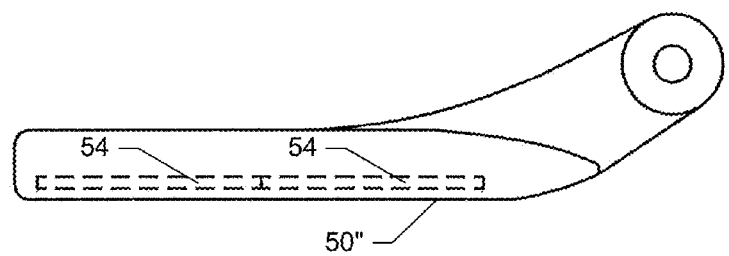
FIG. 8B.
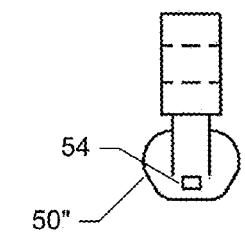
FIG. 8C.

FIG. 12A.
FIG. 12B.
FIG. 12C.

LINEAR AND CIRCULAR DOWNSCAN IMAGING SONAR

RELATED APPLICATION

The present invention is a Continuation of U.S. patent application Ser. No. 12/460,093, filed Jul. 14, 2009, entitled "Linear And Circular Downscan Imaging Sonar," which is incorporated by reference in its entirety.

FIELD OF THE INVENTION

Embodiments of the present invention relate generally to sonar systems, and more particularly, to providing an ability to display images from both linear and circular downscan transducers.

BACKGROUND OF THE INVENTION

Sonar has long been used to detect waterborne or underwater objects. For example, sonar devices may be used to determine depth and bottom topography, detect fish or other waterborne contacts, locate wreckage, etc. In this regard, due to the extreme limits to visibility underwater, sonar is typically the most accurate way for individuals to locate objects underwater. Devices such as transducer elements, or simply transducers, have been developed to produce sound or vibrations at a particular frequency that is transmitted into and through the water and also to detect echo returns from the transmitted sound that return to the transducer after reflecting off an object. The transducers can convert electrical energy into sound energy and also convert sound energy (e.g., via detected pressure changes) into an electrical signal, although some transducers may act only as a hydrophone for converting sound energy into an electrical signal without having a transmitting capability. The transducers are often made using piezoelectric materials.

A typical transducer produces a beam pattern that emanates as a sound pressure signal from a small source such that the sound energy generates a pressure wave that expands as it moves away from the source. For instance, a circular transducer (e.g., a cylindrical shaped crystal with a circular face) typically creates a conical shaped beam with the apex of the cone being located at the source. Any reflected sound then returns to the transducer to form a return signal that may be interpreted as a surface of an object. Such transducers have often been directed in various directions from surfaced or submerged vessels in order to attempt to locate other vessels and/or the seabed for the purposes of navigation and/or target location.

Since the development of sonar, display technology has also been improved in order to enable better interpretation of sonar data. Strip chart recorders and other mechanical output devices have been replaced by, for example, digital displays such as LCDs (liquid crystal displays). Current display technologies continue to be improved in order to provide, for example, high quality sonar data on multi-color, high resolution displays having a more intuitive output than early sonar systems were capable of producing.

With display capabilities advancing to the point at which richly detailed information is able to be displayed, attention has turned back to the transducer in order to provide higher quality data for display. Furthermore, additional uses have been developed for sonar systems as transducer and display capabilities have evolved. For example, sonar systems have been developed to assist fishermen in identifying fish and/or the features that tend to attract fish. Historically, these types of sonar systems primarily analyzed the column of water beneath a watercraft with a cylindrical piezo element that produces a conical beam, known as a conical beam transducer or simply as a circular transducer referring to the shape of the face of the cylindrical element. However, with the advent of sidescan sonar technology, fishermen were given the capability to view not only the column of water beneath their vessel, but also view water to either side of their vessel.

Sidescan sonar can be provided in different ways and with different levels of resolution. As its name implies, sidescan sonar is directed to look to the side of a vessel and not below the vessel. In fact, many sidescan sonar systems (e.g., swath and bathymetry sonar systems) have drawn public attention for their performance in the location of famous shipwrecks and for providing very detailed images of the ocean floor, but such systems are costly and complex. Sidescan sonar typically generates a somewhat planar fan-shaped beam pattern that is relatively narrow in beamwidth in a direction parallel to the keel of a vessel deploying the sidescan sonar and is relatively wide in beamwidth in a direction perpendicular to the keel of the vessel. It may be provided in some cases using multibeam sonar systems. Such multibeam sonar systems are typically comprised of a plurality of relatively narrowly focused conventional circular transducer elements that are arrayed next to each other to produce an array of narrowly focused adjacent conical beams that together provide a continuous fan shaped beam pattern. FIG. 1 shows an example of a series of conventional (generally circular) transducer elements 10 arrayed in an arc to produce a multibeam sonar system. FIG. 2 shows a typical fan shaped beam pattern 12 produced by the multibeam sonar system of FIG. 1 as the beam pattern is projected onto the seabed.

However, multibeam sonar systems typically require very complex systems to support the plurality of transducers that are employed in order to form the multibeam sonar system. For example, a typical system diagram is shown in FIG. 3, which includes a display 20 driven by a sonar signal processor 22. The sonar signal processor 22 processes signals received from each of a plurality of transducers 26 that are fed to the sonar signal processor 22 by respective different transceivers 24 that are paired with each of the transducers 26. Thus, conventional multibeam sonar systems tend to include a large number of transceivers and correspondingly introduce complexity in relation to processing the data such systems produce.

More recently, ceramic sidescan transducer elements have been developed that enable the production of a fan shaped sonar beam directed to one side of a vessel. Accordingly, the sea floor on both sides of the vessel can be covered with two elements facing on opposite sides of the vessel. These types of sidescan transducer elements are linear, rather than cylindrical, and provide a somewhat planar fan-shaped beam pattern using a single transducer to provide sidescan sonar images without utilizing the multibeam array described above. However, employment of these types of sidescan elements typically leaves the column of water beneath the vessel either un-monitored, or monitored using conical beam or circular transducers. In this regard, FIG. 4 illustrates an example of a conventional sidescan sonar with linear sidescan transducer elements oriented to produce fan-shaped beams 27 directed from opposite sides of the vessel and a conical beam 28 projecting directly below the vessel. These beams have conventionally been provided to have a conical shape by using conventional cylindrical transducers to produce depth information since sidescan transducers are typically not as useful for providing depth or water column feature information, such as fish targets. However, cylindrical transducers provide poor quality images for sonar data relating to the bottom structure directly below the vessel.

Accordingly, it may be desirable to develop a sonar system that is capable of providing an improved downscan imaging sonar.

BRIEF SUMMARY OF THE INVENTION

Accordingly, embodiments of the present invention employ a linear transducer, directed downward to receive high quality images relative to the water column and bottom features directly beneath the linear transducer and the vessel on which the linear transducer is employed and also employ a circular transducer to provide greater sensitivity with respect to detecting small objects in the water column. Embodiments of the present invention may then provide for a combination of the data from the linear transducer and the circular transducer to be displayed. As such, the advantages of each type of transducer may be combined to produce an improved downscan sonar display.

In one exemplary embodiment, a method for providing a combined linear and circular downscan sonar display is provided. The method may include receiving linear downscan sonar data from a linear downscan transducer, receiving conical downscan sonar data from a circular downscan transducer, and combining the linear downscan sonar data and the conical downscan sonar data to produce combined downscan sonar data.

In another exemplary embodiment, a computer program product for providing a combined linear and circular downscan sonar display is provided. The computer program product may include at least one computer-readable storage medium having computer-executable program code portions stored therein. The computer-executable program code portions may include program code instructions for receiving linear downscan sonar data from a linear downscan transducer, receiving conical downscan sonar data from a circular downscan transducer, and combining the linear downscan sonar data and the conical downscan sonar data to produce combined downscan sonar data.

In another exemplary embodiment, an apparatus for providing a combined linear and circular downscan sonar display is provided. The apparatus may include a sonar signal processor configured for receiving linear downscan sonar data from a linear downscan transducer, receiving conical downscan sonar data from a circular downscan transducer, and combining the linear downscan sonar data and the conical downscan sonar data to produce combined downscan sonar data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8A is a diagram showing a perspective view of a linear downscan transducer array including two linear downscan transducers within a single housing from a point above the housing according to an exemplary embodiment of the present invention;

FIG. 8B is a perspective view from one side of the housing of FIG. 8A at a point substantially perpendicular to a longitudinal axis of the housing according to an exemplary embodiment of the present invention;

FIG. 8C is a perspective view from the front side of the housing of FIG. 8A at a point looking straight down the longitudinal axis of the housing according to an exemplary embodiment of the present invention;

FIG. 12A is an example image of conical downscan sonar data alone according to an exemplary embodiment of the present invention;

FIG. 12B illustrates linear downscan sonar data displayed alone in an example image according to an exemplary embodiment of the present invention;

FIG. 12C illustrates combined linear and conical downscan sonar data displayed in a single display window according to an exemplary embodiment of the present invention;

DETAILED DESCRIPTION OF THE INVENTION

Figure 1:
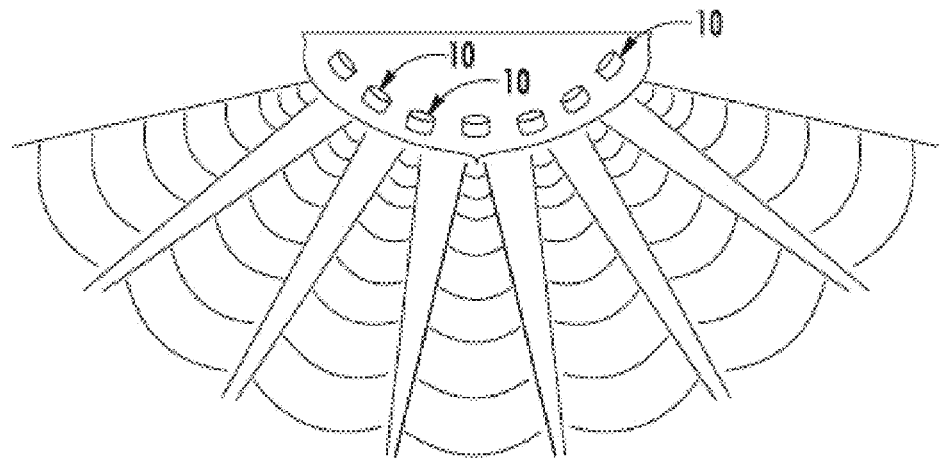
FIG. 1 is a diagram illustrating an example of a series of conventional transducer elements 10 arrayed to produce a multibeam sonar system.
Figure 2:
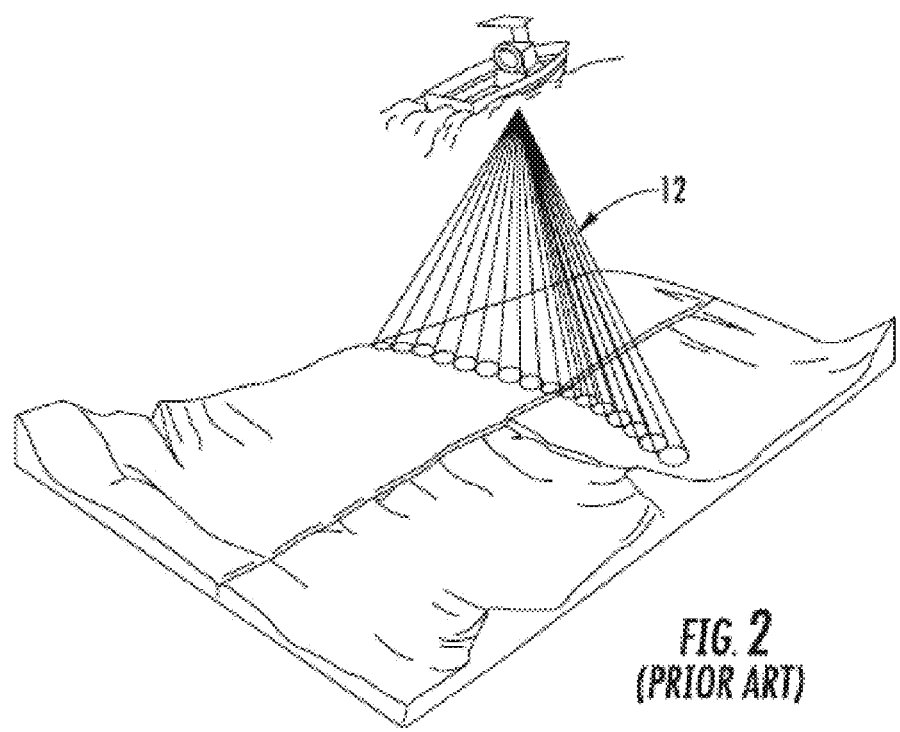
FIG. 2 illustrates a fan shaped beam pattern produced by the conventional multibeam sonar system of FIG. 1 as the beam pattern is projected onto the seabed.
Figure 3:
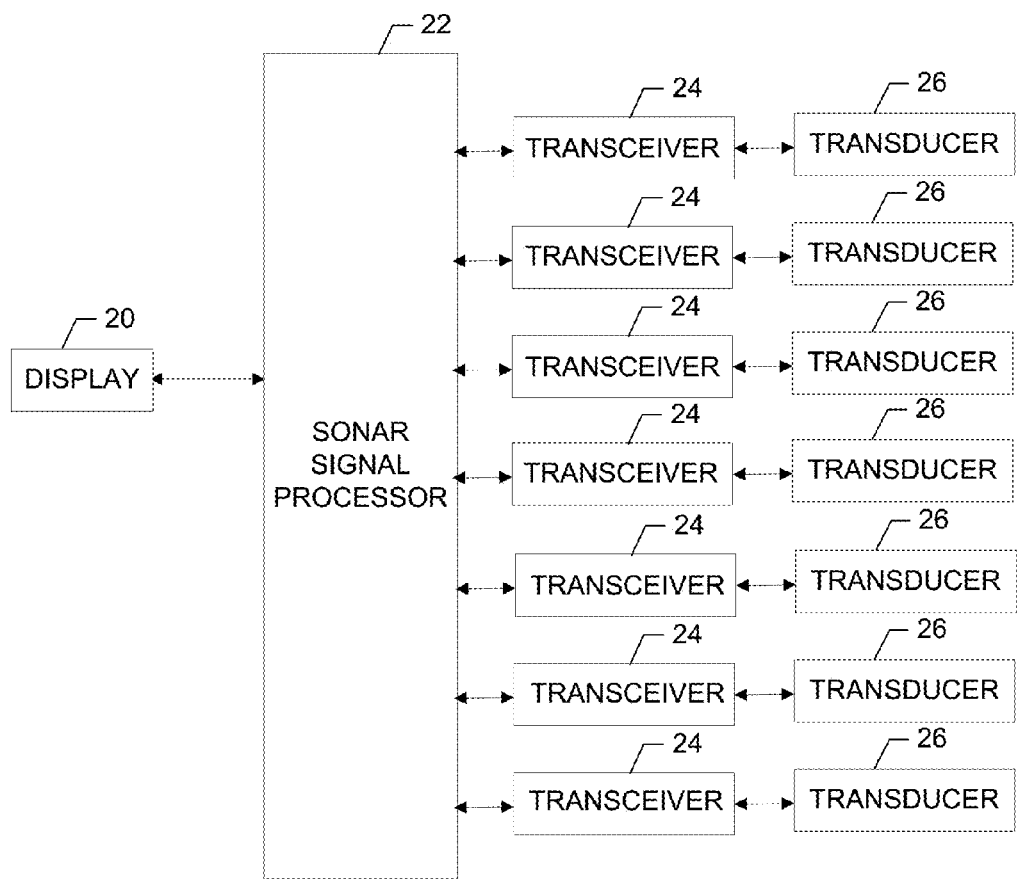
FIG. 3 is a block diagram of a conventional multibeam sonar system for the system shown in FIG. 1.
Figure 4:
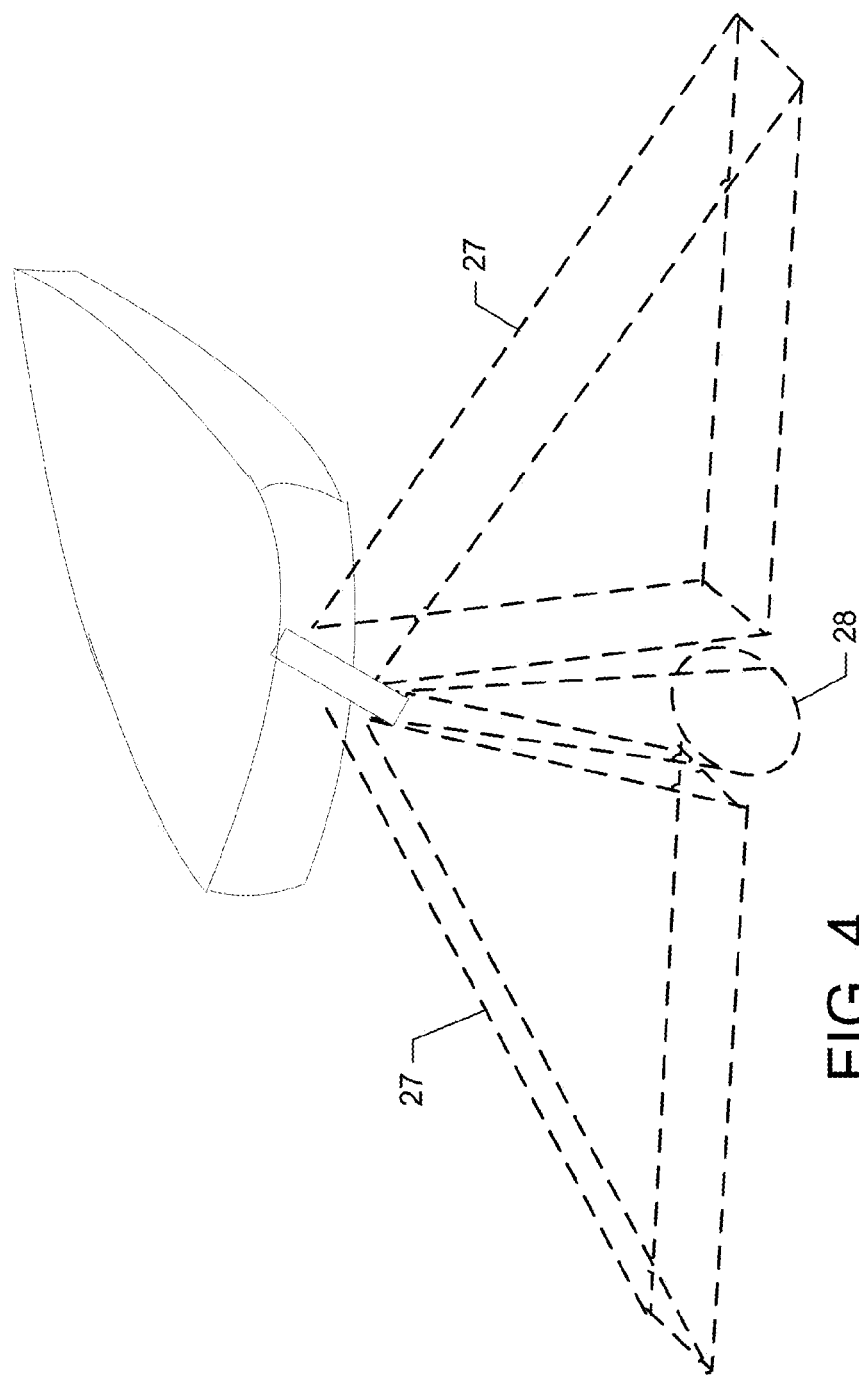
FIG. 4 is a diagram illustrating a conventional sidescan sonar system.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Conventionally, sonar transducers generally don't have overlapping coverage areas in order to minimize interference. Furthermore, since different types of transducers typically may operate with different frequencies and produce different data with corresponding different images, it has been considered impractical or undesirable to combine the output of different types of transducers into a single display. However, embodiments of the present invention overcome some of the technical challenges associated with combining data from different types of transducers and provide flexibility in providing a useful output of combined data to the user.

Figure 5:
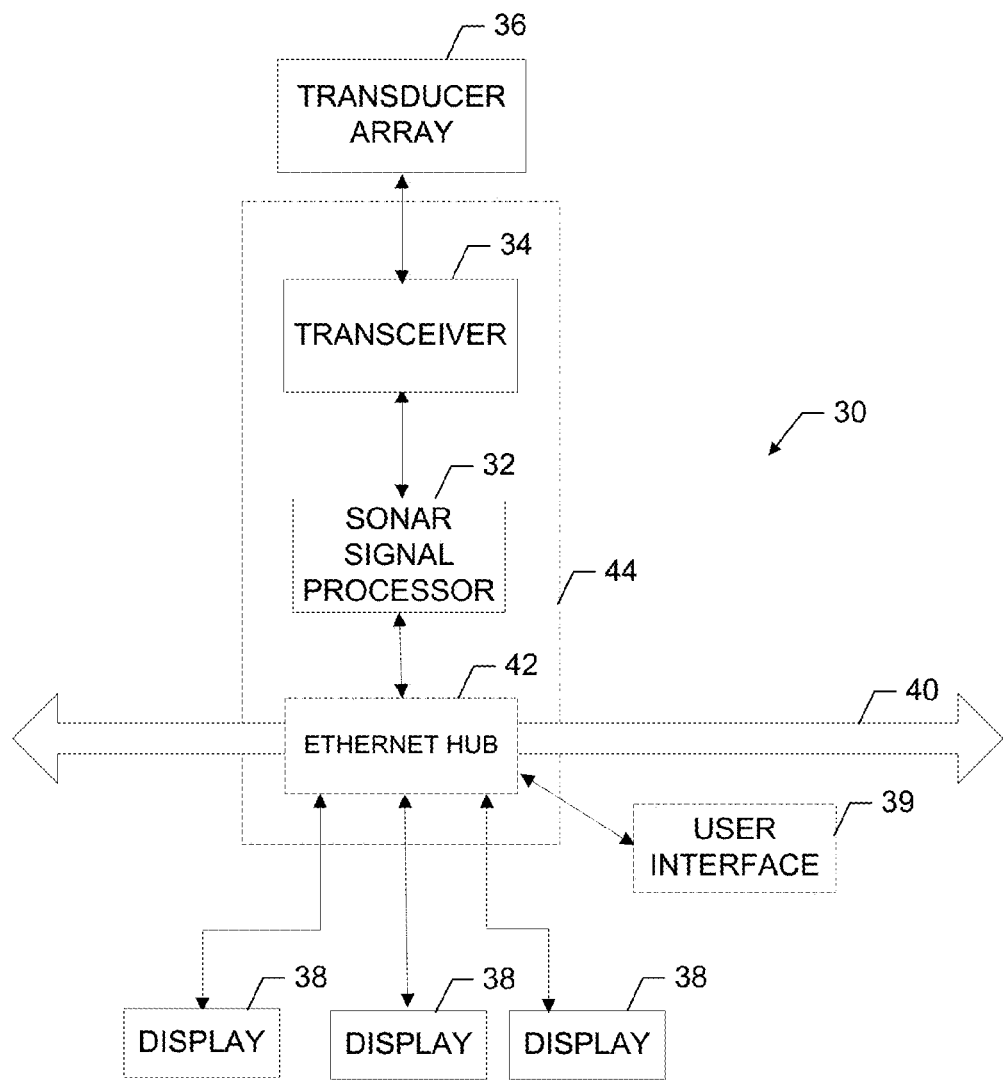
FIG. 5 is a basic block diagram illustrating a sonar system according to an exemplary embodiment of the present invention.

FIG. 5 is a basic block diagram illustrating a sonar system 30 for use with multiple exemplary embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer array 36 and/or numerous other peripheral devices such as one or more displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. However, in some embodiments, components may communicate directly with one another, or be in a common housing, and thus, no network may be provided.

The display 38 may be configured to display images and may include or otherwise be in communication with a user interface 39 configured to receive an input from a user. The display 38 may be, for example, a conventional LCD (liquid crystal display), a touch screen display or any other suitable display known in the art upon which images may be rendered.

Although each display 38 of FIG. 5 is shown as being connected to the sonar signal processor 32 via the network and/or via an Ethernet hub, the display 38 could alternatively be in direct communication with the sonar signal processor 32 in some embodiments. Each display 38 may be configured to receive input data from the sonar signal processor 32 (or from an image processor or driving circuitry in communication with or forming a portion of the signal processor 32) and render (e.g., represent, display, present, or depict) the input data in one or more display windows on the display 38. Thus, for example, one or more of the displays 38 may be configured to render different windows that may each display a different type of data or view and, in some cases, more than one of the different windows may be displayed at a time. In this regard, for example, one window may display sonar data from a particular type of transducer while another display window shows sonar data from another type of transducer. In other cases, one window may display sonar data, while another window displays other data such as positioning data or radar data. Furthermore, in an exemplary embodiment of the present invention, one display window may actually display combined sonar data from two different types of transducers.

The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

The transducer array 36 according to an exemplary embodiment may be provided in one or more housings that may provide for flexible mounting with respect to a hull of the vessel on which the sonar system 30 is employed. In this regard, for example, the housing(s) may be mounted onto the hull of the vessel or onto a device or component that may be attached to the hull (e.g., a trolling motor or other steerable device, or another component that is mountable relative to the hull of the vessel). The transducer array 36 may include one or more transducer elements positioned within the housing, as described in greater detail below, and each of the transducer elements may be configured to be directed to cover a respective area of the water column and/or bottom structure in the vicinity of the vessel. In an exemplary embodiment, the transducer elements of the transducer array 36 may include at least one linear transducer and at least one circular transducer. Moreover, in an exemplary embodiment, the transducer array may be oriented downward in order to monitor water and bottom features below the vessel. The transducer array 36 may be configured to both transmit and receive sound pressure waves. However, in some cases, the transducer array 36 could include separate elements for transmission and reception. The transducer array 36 is described in greater detail below, but further variations of the transducer array and other aspects related to the sonar module are described in U.S. patent application Ser. No. 12/460,139, entitled "Downscan Imaging Sonar" filed on even date herewith, the disclosure of which is incorporated herein by reference in its entirety.

In an exemplary embodiment, the sonar signal processor 32, the transceiver 34 and an Ethernet hub 42 or other network hub may form a sonar module 44. As such, for example, in some cases, the transducer array 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device drivers accessible to the Ethernet hub 42 to enable the Ethernet hub 42 to properly work with displays for which the sonar module 44 is compatible. The sonar module 44 may also be enabled to be upgraded with additional device drivers to enable expansion of the numbers and types of devices with which the sonar module 44 may be compatible. In some cases, the user may select a display type to check whether a the display type is supported and, if the display type is not supported, contact a network entity to request software and/or drivers for enabling support of the corresponding display type. In still other cases, particularly in situations in which there is no Ethernet hub 42 and/or network 40, the sonar module 44 may include a single display 38.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer array 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include circuitry for providing transmission electrical signals to the transducer array 36 for conversion to sound pressure signals based on the provided electrical signals to be transmitted as a sonar pulse. The transceiver 34 may also include circuitry for receiving electrical signals produced by the transducer array 36 responsive to sound pressure signals received at the transducer array 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns.

Figure 6A:
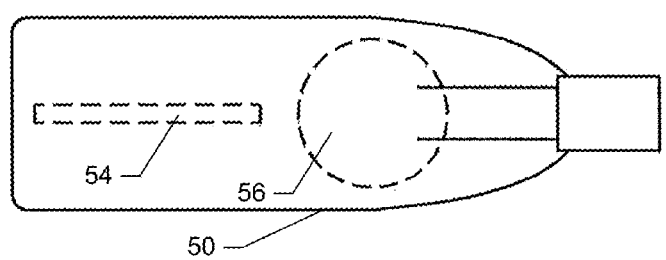
FIG. 6A is a diagram showing a perspective view of a linear downscan transducer and a circular downscan transducer within a single housing from a point above the housing according to an exemplary embodiment of the present invention.
Figure 6B:
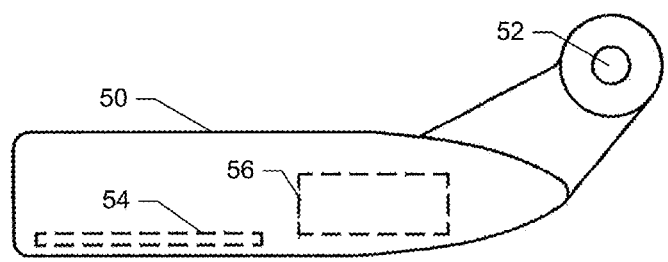
FIG. 6B is a perspective view from one side of the housing of FIG. 6A at a point substantially perpendicular to a longitudinal axis of the housing according to an exemplary embodiment of the present invention.
Figure 6C:
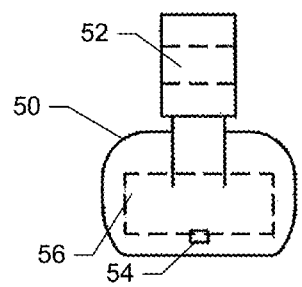
FIG. 6C is a perspective view from the front side of the housing of FIG. 6A at a point looking straight down the longitudinal axis of the housing according to an exemplary embodiment of the present invention.

FIG. 6 (which includes FIGS. 6A, 6B and 6C) is a diagram illustrating a more detailed view of at least a portion of the transducer array 36 according to an exemplary embodiment. As shown in FIG. 6, the transducer array 36 may include a housing 50 that may include one or more mounting holes 52 through which screws, rivets, bolts or other mounting devices may be passed in order to fix the housing 50 to a mounting bracket, a device attached to a vessel or to the hull of the vessel itself. However, in some cases, the housing 50 may be affixed by welding, adhesive, snap fit or other coupling means. The housing 50 may be mounted to a portion of the vessel, or to a device attached to the vessel, that provides a relatively unobstructed view of at least the column of water beneath the vessel. Thus, for example, the housing 50 may be mounted on or near the keel (or centerline) of the vessel, on a fixed or adjustable mounting bracket that extends below a depth of the keel (or centerline) of the vessel, or on a mounting device that is offset from the bow or stern of the vessel.

FIG. 6A is a perspective view from above the housing 50. Meanwhile, FIG. 6B is a perspective view from one side of the housing 50 at a point substantially perpendicular to a longitudinal axis of the housing 50 and FIG. 6C is a perspective view from the front side of the housing 50 at a point looking straight down the longitudinal axis of the housing 50. As shown in FIGS. 6A-6C, the transducer array 36 may include a linear downscan transducer 54 and a circular downscan transducer 56. Each of the linear downscan transducer 54 and the circular downscan transducer 56 may be disposed within the housing 50 such that transmissions emanating from the linear downscan transducer 54 and the circular downscan transducer 56 are directed into the water column and toward bottom features substantially directly below the vessel. In other words, the linear downscan transducer 54 and the circular downscan transducer 56 are referred to as "downscan" transducers because each of the linear downscan transducer 54 and the circular downscan transducer 56 are directed downward relative to a surface of the body of water on which the vessel may operate.

In an exemplary embodiment, the linear downscan transducer 54 and the circular downscan transducer 56 may each be disposed to be in planes that are substantially parallel with each other and with a plane in which the longitudinal axis of the housing 50 lies. Generally speaking, the linear downscan transducer 54 and the circular downscan transducer 56 may also be displosed in line with the longitudinal axis of the housing 50. Although shown in a particular order in FIGS. 6A-6C, the ordering of the placement of the linear downscan transducer 54 and the circular downscan transducer 56 within the housing 50 may be reversed or varied in some examples. Furthermore, in some cases, the linear downscan transducer 54 and the circular downscan transducer 56 may each be located in their own respective separate housings rather than both being within a single housing.

Figure 7A:
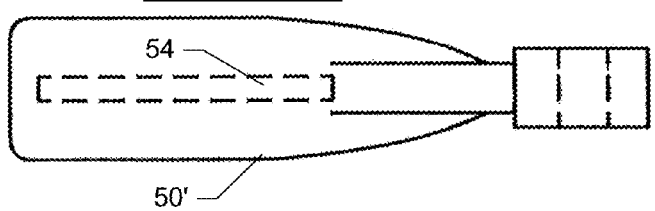
FIG. 7A is a diagram showing a perspective view of a linear downscan transducer within a single housing from a point above the housing according to an exemplary embodiment of the present invention.
Figure 7B:
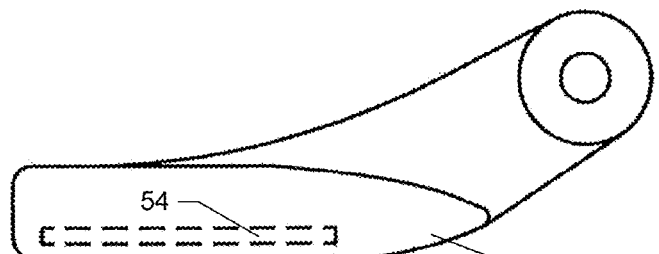
FIG. 7B is a perspective view from one side of the housing of FIG. 7A at a point substantially perpendicular to a longitudinal axis of the housing according to an exemplary embodiment of the present invention.
Figure 7C:
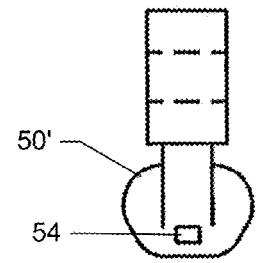
FIG. 7C is a perspective view from the front side of the housing of FIG. 7A at a point looking straight down the longitudinal axis of the housing according to an exemplary embodiment of the present invention.

In this regard, for example, in some cases the linear downscan transducer 54 may be within its own housing 50' as shown in FIG. 7 (which includes FIGS. 7A, 7B and 7C). Similarly, although not specifically shown, the circular downscan transducer 56 may be disposed within its own housing, such as a relatively cylindrically shaped housing that may be mounted near the housing 50' of the linear downscan transducer 54. As such, by way of comparison to FIG. 6, FIGS. 7A through 7C illustrate diagrams of the linear downscan transducer 54 in the housing 50' from various different perspectives. In this regard, FIG. 7A is a perspective view from above the housing 50'. Meanwhile, FIG. 7B is a perspective view from one side of the housing 50' at a point substantially perpendicular to a longitudinal axis of the housing 50' and FIG. 7C is a perspective view from the front side of the housing 50' at a point looking straight down the longitudinal axis of the housing 50'. As shown in FIGS. 7A-7C, by employing only the linear downscan transducer 54, the size of the housing 50' may be reduced. In this regard, for example, particularly FIG. 7C shows a reduction in the cross sectional size of the housing 50' as compared to the cross sectional size of the housing 50 of FIG. 6C. Thus, for example, the housing 50' may introduce less drag than the housing 50.

As indicated above, the transducer array 36 may include one or more of the linear downscan transducer 54 and one or more of the circular downscan transducer 56. FIG. 8 (which includes FIGS. 8A, 8B and 8C) illustrates an example where multiple linear downscan tranducers are included within a housing 50" to illustrate a modification of the example shown in FIG. 7. However, in some cases, multiple linear downscan transducers could be implemented in connection with the example of FIG. 6. In other words, a single housing could include multiple linear downscan transducers and one or more circular downscan transducers.

The housing (e.g., housing 50) may include a recessed portion defining containment volume for holding transducer elements (e.g., the linear downscan transducer element 54 and the circular downscan transducer element 56). The recessed portion defining the containment volume may extend over a substantial portion of the length the housing 50. To prevent cavitation or the production of bubbles due to uneven flow over the housing 50, the housing 50 (and in particular the containment volume portion of the housing) may have a gradual rounded profile to permit laminar flow of water over the housing 50. In some examples, one or more insulated cables may provide a conduit for wiring to communicatively couple the transducer elements of the transducer array 36 to the sonar module 44.

In an exemplary embodiment, the linear downscan transducer 54 may be formed of a rectangular prism shaped crystal forming a linear transducer element. Thus, for example, the linear downscan transducer 54 may be substantially rectangular in shape and made from a piezoelectric material such as a piezoelectric ceramic material, as is well known in the art and may include appropriate shielding (not shown) as is well known in the art. The piezoelectric material being disposed in a rectangular arrangement provides for an approximation of a linear array having beamwidth characteristics that are a function of the length and width of the rectangular face of the transducer element of the linear downscan transducer 54 and the frequency of operation. In an exemplary embodiment, the linear downscan transducer 54 may be configured to operate in accordance with at least two operating frequencies. In this regard, for example, a frequency selection capability may be provided by the sonar module 44 to enable the user to select one of perhaps multiple frequencies of operation. In one example, one operating frequency may be set to about 800 kHz and another operating frequency may be set to about 455 kHz. Furthermore, the length of the transducer elements may be set to about 120 mm while the width is set to about 3 mm to thereby produce beam characteristics corresponding to a bearing fan of about 0.8 degrees by about 32 degrees at 800 kHz or about 1.4 degrees by about 56 degrees at 455 kHz. However, in general, the length and width of the linear downscan transducer 54 may be set such that the beamwidth of sonar beam produced by the linear downscan transducer 54 in a direction parallel to a longitudinal length (L) of the linear downscan transducer 54 is less than about five percent as large as the beamwidth of the sonar beam in a direction (w) perpendicular to the longitudinal length of the linear downscan transducer 54. (See generally FIG. 9.) It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped boundaries, those boundaries merely correspond to the −3 dB (or half power) points for the transmitted beams. In other words, energy measured outside of the boundaries shown is less than half of the energy transmitted. Thus, the boundaries shown are merely theoretical half power point boundaries.

Although dual frequency operations providing a specific beam fan for each respective element for given lengths are described above, it should be understood that other operating ranges could alternatively be provided with corresponding different transducer element sizes and corresponding different beamwidth characteristics. Moreover, in some cases, the sonar module 44 may include a variable frequency selector, to enable an operator to select a particular frequency of choice for the current operating conditions. However, in all cases where the longitudinal length of the linear downscan transducer 54 is generally aligned with the centerline of the vessel and the linear downscan transducer 54 is oriented to transmit pulses into the water column below the vessel, the rectangular shape of the linear downscan transducer 54 provides for a narrow beamwidth in a direction substantially parallel to the centerline of the vessel and wide beamwidth in a direction substantially perpendicular to the centerline of the vessel. However, if the transducer array 36 is mounted in a different fashion or to a rotatable accessory on the vessel (e.g., a trolling motor mount), the fan-shaped beams produced will have the wide beamwidth in a direction substantially perpendicular to the longitudinal length of the housing 50 and a narrow beamwidth in a direction substantially parallel to the longitudinal length of the housing 50 regardless of the orientation of the vessel. Thus, the sonar could also be oriented to provide fore and aft oriented fan-shaped beams or any other orientation relative to the vessel in instances where motion of the vessel is not necessarily in a direction aligned with the centerline of the vessel.

Figure 9A:
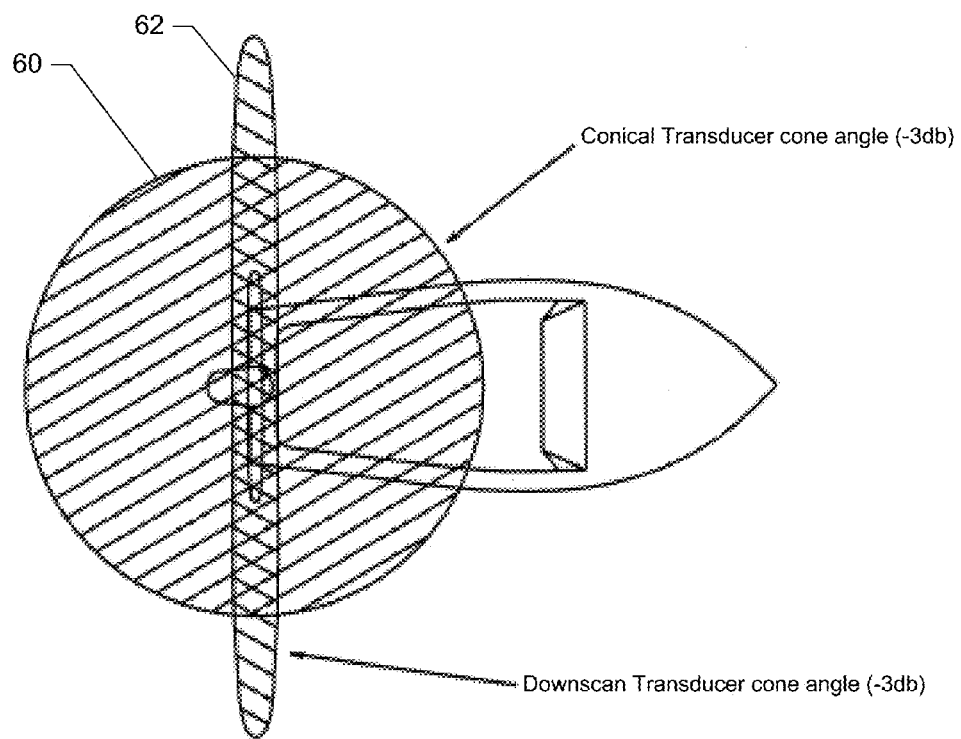
FIG. 9A illustrates an example of a top view of the beam overlap that may occur in situations where a linear downscan transducer and a circular downscan transducer are employed simultaneously according to an exemplary embodiment of the present invention.
Figure 9B:
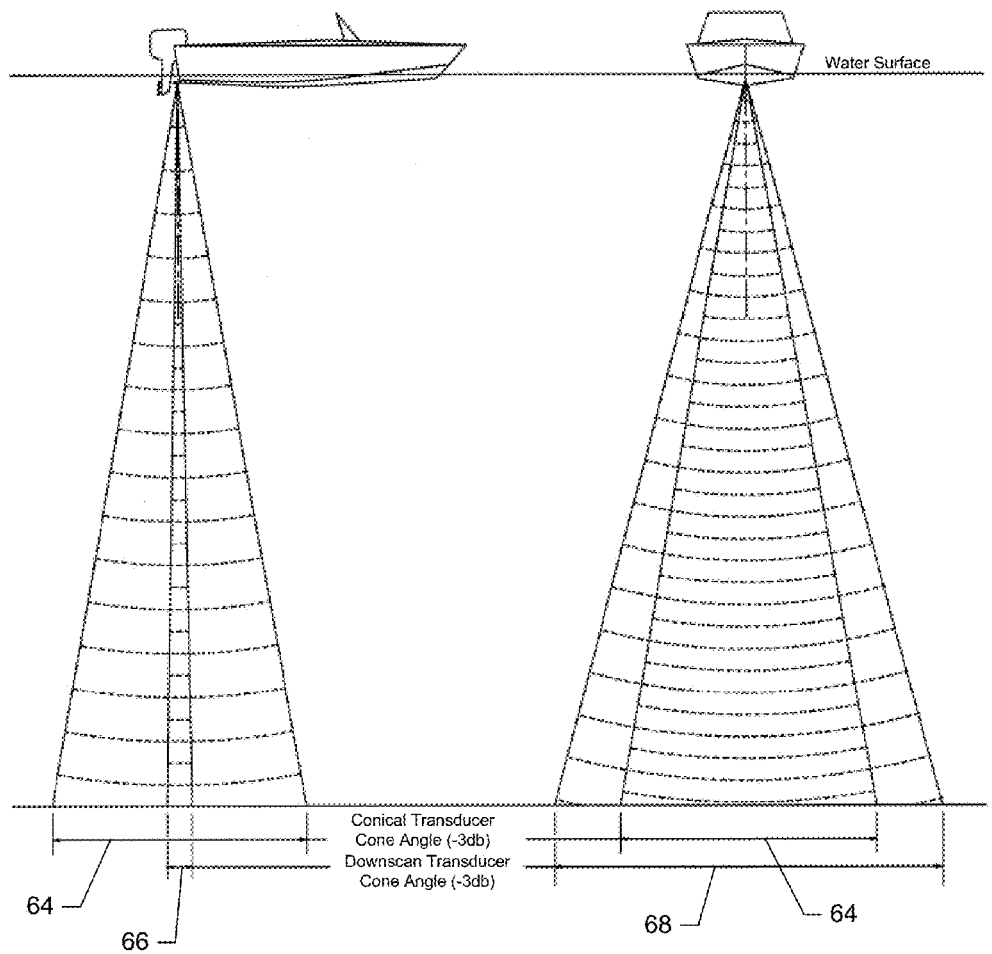
FIG. 9B shows side views of the same beam overlap shown in FIG. 9A from the starboard side of a vessel and from ahead of the bow of the vessel according to an exemplary embodiment of the present invention.

FIG. 9 (which includes FIGS. 9A and 9B) shows an illustration of the beam characteristics produced by an exemplary embodiment of the present invention. In this regard, FIG. 9A illustrates an example of a top view of the beam overlap that may occur in situations where the linear downscan transducer 54 and the circular downscan transducer 56 are employed simultaneously. FIG. 9B shows side views of the same beam overlap shown in FIG. 9A from the starboard side of a vessel (on the left side of the page) and from ahead of the bow of the vessel (on the right side of the page). As shown in FIG. 9A, there is overlap between a conical beam projection 60 showing an example coverage area of a beam produced by the circular downscan transducer 56 and a linear downscan beam projection 62 showing an example coverage area of a beam produced by the linear downscan transducer 54. The differences between the beam patterns of the linear downscan transducer 54 and the circular downscan transducer 56 are further illustrated in FIG. 9B in which it can be seen that the beamwidth 64 of the beam produced by the circular downscan transducer 56 is substantially the same regardless of the side from which the beam is viewed. However, the beamwidth 66 of the beam produced by the linear downscan transducer 54 as viewed from the starboard side of the vessel is substantially smaller than the beamwidth 68 of the beam produced by the linear downscan transducer as viewed from ahead of the bow of the vessel. Moreover, the beamwidth 68 is wider than the beamwidth 64, while the beamwidth 66 is narrower than the beamwidth 64.

Due to the differences in beamwidth, particularly in the direction parallel to the centerline of the vessel, it may take several linear downscan transducer beams to cover the same area that is covered by a single circular downscan transducer beam. However, one difference between a typical linear downscan transducer and a typical circular downscan transducer is that linear downscan transducers typically provide each new beam without any (or very little) overlap with prior beams (at least with respect to boundaries of the beams as defined by the half power points of the beams). Due to the minimal overlapping of linear downscan transducer beams, objects that show up on a display of linear downscan data are typically relatively crisp and clear. Meanwhile, conical beams from a circular downscan transducer typically overlap each other. Thus, since return data may be received from objects over multiple scans, return data often appears to be blurred to some extent. For example, fish or other suspended objects often appear as "arches" on a display of circular downscan transducer data.

The above described differences between linear and circular downscan transducer beams provide display characteristics that some may consider advantageous for each respective display. For example, the relatively cleaner lines provided by a display of linear downscan transducer data may make it easier to see bottom features such as trees, boulders or other objects even to the point where tree limbs are clearly visible in some cases. Furthermore, suspended objects such as fish or schools of fish may appear more crisply on a display of linear downscan transducer data. However, due to the narrow beamwidth of the linear downscan transducer 54 in the direction of motion of the vessel, smaller objects may be more difficult to discern in some cases. Thus, display data corresponding to a circular downscan transducer may often be more sensitive to picking up objects, and particularly smaller objects, than data corresponding to a linear downscan transducer. Additionally, many users are very familiar with reading a display of circular downscan transducer data as it has been used for a long time, while linear downscan transducers are new, so it may initially be difficult for some users to read data from a linear downscan transducer.

Figure 10:
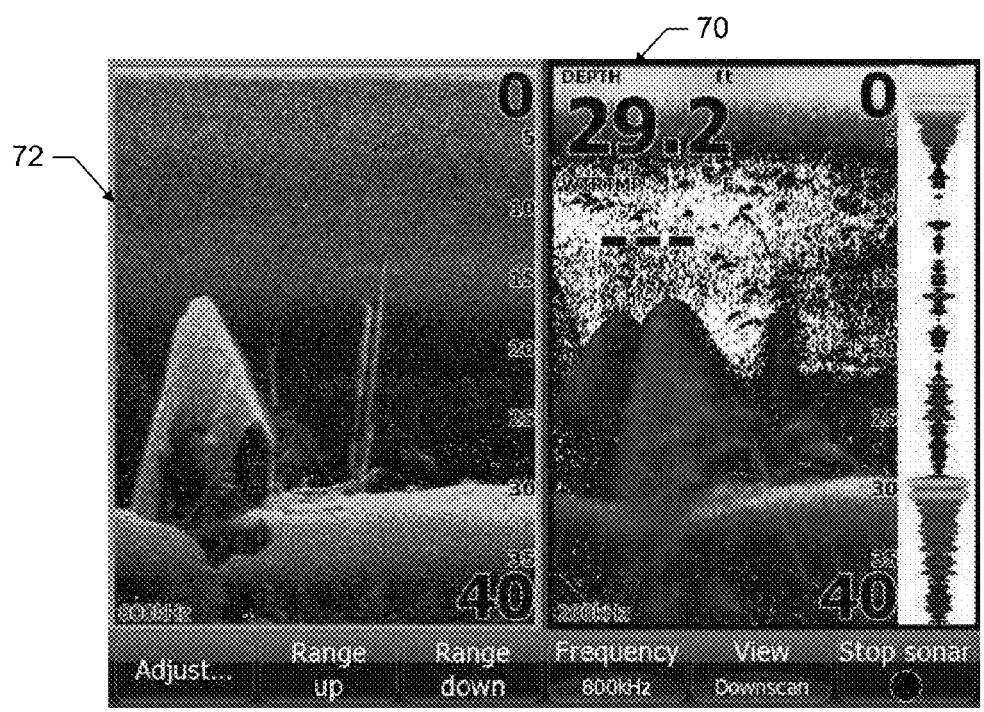
FIG. 10 illustrates the provision of separate display windows for linear and circular downscan transducer data, respectively, according to an exemplary embodiment of the present invention.

Given the characteristics described above, it may be useful to incorporate characteristics from linear downscan transducer data with characteristics from circular downscan transducer data to provide users with a display that incorporates aspects of each. Thus, for example, certain characteristics that may be seen as being advantageous from each type of data may have potential for incorporation into a single display. Users may therefore be provided with a display that is, in some cases, easier to read and provides comprehensive information regarding the water column and bottom features directly below the vessel. Although it may be possible to provide a single display with one display window showing data corresponding to a linear downscan transducer in one portion of the display and another display window corresponding to a circular downscan transducer in another portion of the display (e.g., as shown in the example of FIG. 10), it may in some cases be preferable to offer aspects of both sets of data within a single display window. In this regard, a single display window may be all that is practical for some smaller sized displays and, even on larger displays, users may prefer a more comprehensive display that provides combined data from both linear and circular downscan transducers in a single display window.

FIG. 10 illustrates the provision of separate display windows for linear and circular downscan transducer data, respectively. In this regard, display window 70 and display window 72 may each be provided on the same display (e.g., one of the displays 38). Display window 70 shows data corresponding to a circular downscan transducer (e.g., the circular downscan transducer 56). Meanwhile, display window 72 shows data corresponding to a linear downscan transducer (e.g., the linear downscan transducer 54). As discussed above, the display of the different types of data in different display windows may not always be preferable or desirable. Accordingly, some exemplary embodiments of the present invention may provide for a combination of the circular downscan transducer data and the linear downscan transducer data into a single display window.

In an exemplary embodiment, the combination of circular downscan transducer data and linear downscan transducer data into a single display window may be accomplished by the sonar module 44. To accomplish the incorporation of characteristics of both linear and circular downscan transducer data into a single display window, for example, the sonar module 44 may combine linear downscan sonar data from a linear downscan transducer with conical downscan sonar data from a circular downscan transducer. In an exemplary embodiment, the combination may be accomplished via the sonar signal processor 32. As such, for example, the sonar signal processor 32 may be programmed (either via hardware or software or a combination thereof) to combine linear downscan sonar data and the conical downscan sonar data received from the linear downscan transducer 54 and the circular downscan transducer 56, respectively. In some cases, a portion of the sonar signal processor 32 (e.g., an image processor or some other dedicated processor) may be configured to perform the combination. As such, for example, the sonar signal processor 32 is configured to receive linear downscan sonar data from a linear downscan transducer and receive conical downscan sonar data from a circular downscan transducer. The sonar signal processor 32 may then be configured to combine the linear downscan sonar data and the conical downscan sonar data to produce combined downscan sonar data displayable in a single display window.

As described above, and shown in FIG. 9, the linear downscan sonar data and the conical downscan sonar data that is ultimately combined may correspond to respective underwater regions that at least partially overlap. Moreover, due to the potential for asynchronous operation of the linear downscan transducer 54 and the circular downscan transducer 56, the sonar signal processor 32 may be further configured to synchronize the linear downscan sonar data and the conical downscan sonar data prior to the combining. Synchronization may be accomplished by sending a trigger signal at a predetermined interval. In this regard, for example, each sounding or transmission produced by either one of the linear downscan transducer 54 or the circular downscan transducer 56 may be the reference used to synchronize data corresponding to the other one of the linear downscan transducer 54 or the circular downscan transducer 56. The trigger may be operated in either direction and at any sounding interval or at any desired frequency of operation. In other words, for example, each sounding of a less frequently transmitting device may be used to trigger alignment with multiple returns of the more frequently transmitting device or a trigger may be sent every predetermined number of soundings of a more frequently transmitting device to trigger alignment with a smaller number of returns from a lower frequency transmitting device.

In an exemplary embodiment, the sonar signal processor 32 may be configured to produce the combined data for rendering at a display (e.g., one of the displays 38). The combined data may be a superposition of the linear downscan sonar data and the conical downscan sonar data. In some cases, the rendering of the combined data may include rendering base data corresponding to one of the linear downscan sonar data or the conical downscan sonar data and rendering overlay data corresponding to the other of the linear downscan sonar data or the conical downscan sonar data over the base data. In some situations, a level mask may be applied to the overlay data. In other words, for example, only overlay data that is above a predefined threshold may be rendered. In an exemplary embodiment, rather than overlaying data as described above, the sonar signal processor 32 may be configured to blend the linear downscan sonar data with the conical downscan sonar data and render the blended data. When blending is employed, the sonar signal processor 32 may be configured to apply a first weighting factor to the linear downscan sonar data to produce first weighted data and apply a second weighting factor to the conical downscan sonar data to produce second weighted data. In such situations, rendering the blended data may include combining the first weighted data and second weighted data into combined weighted data and rendering the combined weighted data.

Figure 11:
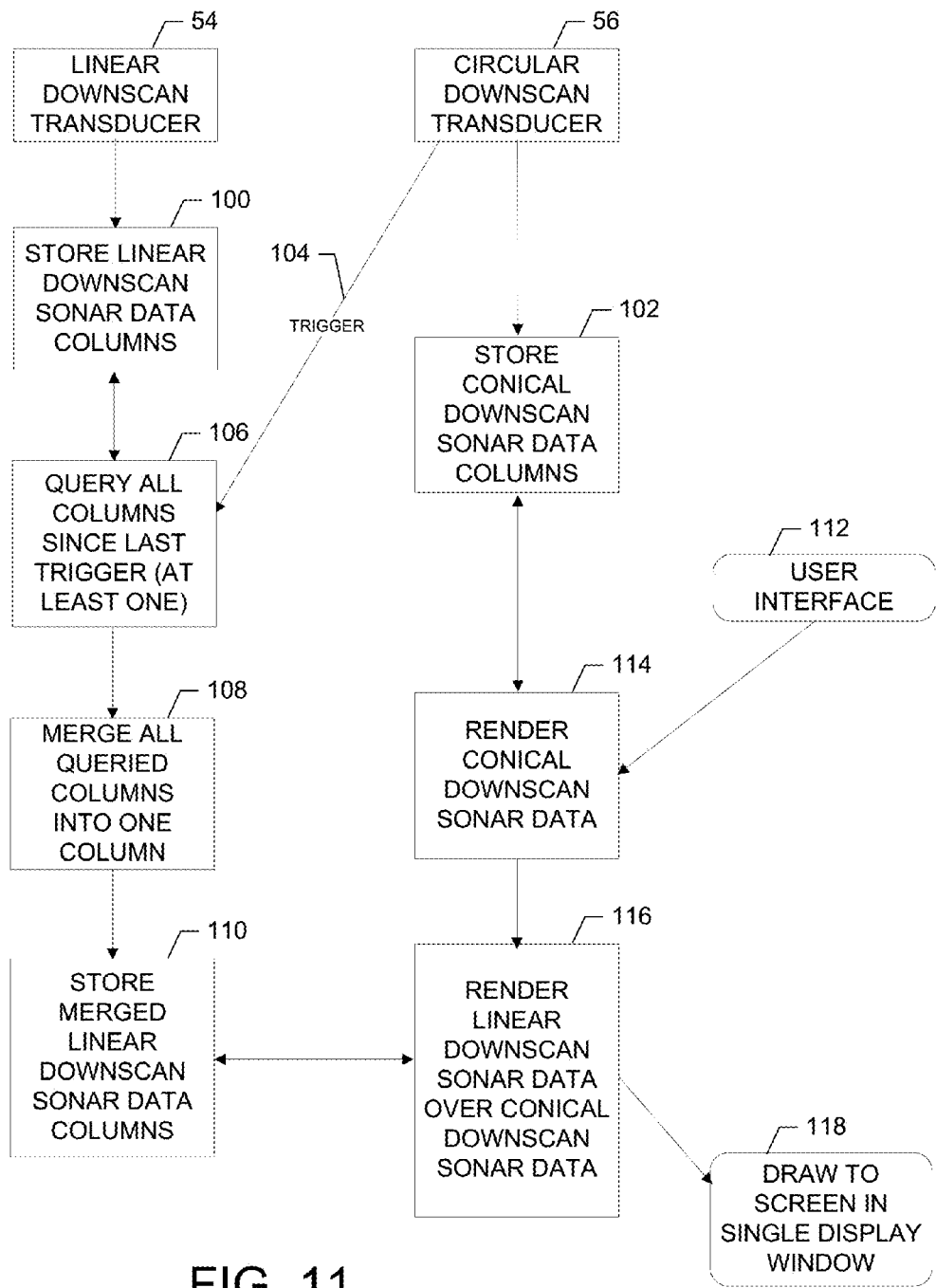
FIG. 11 illustrates a flowchart showing how superposition of linear and conical downscan sonar data may be accomplished according to an exemplary embodiment of the present invention.

FIG. 11 illustrates a flowchart showing how superposition of linear and conical downscan sonar data may be accomplished according to an exemplary embodiment. In this regard, as shown in FIG. 11, linear downscan sonar data from the linear downscan transducer 54 may be stored in columns (e.g., in a memory of or accessible to the sonar signal processor 32) at operation 100. Similarly, conical downscan sonar data may be stored in columns (e.g., in a memory of or accessible to the sonar signal processor 32) at operation 102. In some cases, the circular downscan transducer 56 may operate at a lower frequency than the linear downscan transducer 54, so in this example, each sounding of the circular downscan transducer 56 may be a trigger 104 for synchronization between the conical downscan sonar data and the linear downscan sonar data.

In this example, since multiple linear downscan sonar data columns correspond to each conical downscan sonar data column, the sonar signal processor 32 may query all columns of the stored linear downscan sonar data that have been stored since the last trigger as shown at operation 106. The queried columns, or segments of data, may then be merged into a single linear downscan sonar data column corresponding to its respective conical downscan sonar data column at operation 108. Merging of data may be accomplished by selecting a largest value for each corresponding segment of a plurality of linear downscan sonar data columns and storing the largest value for each segment to form a corresponding second data column. In an alternative embodiment, merging of data may be accomplished by averaging values for each corresponding segment of the plurality of linear downscan sonar data columns and storing an average value for each segment to form a corresponding second data column. The merged data may then be stored (e.g., in a memory of or accessible to the sonar signal processor 32) at operation 110.

At operation 112, the user may utilize the user interface to provide mode selection, sensitivity selection, color palette selection or other user inputs that may impact the rendering of the data. Mode selection could include selecting whether to render only the conical downscan sonar data in the display window, render only the linear downscan sonar data in the display window, or render the combined downscan sonar data in the display window. However, in some cases, the mode selection could also include selecting multiple windows to be simultaneously displayed such as the linear downscan sonar data on one side of the display and the conical downscan sonar data and/or combined data being displayed on another segment of the display. Mode selection could be used to select blending or level masking as described above. However, in some cases, level selection (e.g., for the mask or for blending) could be made as a sensitivity selection. For example, the user may select the predefined threshold of the level mask or may select to render blended data with conical downscan sonar data selected to receive a 70% weight and linear downscan sonar data weighted selected to receive a 30% weight. Color palette selection may be accomplished by providing color schemes from which the user may select to customize the display. For example, the user may select color coding to differentiate conical downscan sonar data from linear downscan sonar data and, within the color codings assigned to each type of data, intensity or color differences may further indicate the strength of sonar return received. Alternatively, the user may select cross-hatching, shades of gray or even black and white as color palette options to distinguish between linear downscan sonar data and conical downscan sonar data. As such, for example, the user interface may be used to control the sonar signal processor 32 with respect to rendering the combined downscan sonar data in the single display window such that return data corresponding to the linear downscan sonar data is provided with a first color scheme and return data corresponding to the conical downscan sonar data is provided with a second color scheme.

At operation 114, the conical downscan sonar data columns (e.g., the base data in this example) may be rendered and then at operation 116, the linear downscan sonar data columns (e.g., the overlay data) may be rendered over the conical downscan sonar data columns. The combined data may then be drawn to the display screen in the same display window at operation 118.

FIG. 12 (which includes FIGS. 12A, 12B and 12C) illustrates some example images that may be useful in explaining operation of an exemplary embodiment. In this regard, FIG. 12A is an image of conical downscan sonar data alone. FIG.

12B illustrates linear downscan sonar data alone. FIG. 12C illustrates combined linear and conical downscan sonar data. As shown in FIG. 12C, since the linear downscan sonar data is overlayed onto the conical downscan sonar data, there is no obscuring of either type of data. Instead, the sensitivity with respect to identifying small objects in the water column below the vessel is provided by the conical downscan sonar data and the clarity of bottom features is provided by the linear downscan sonar data. In this regard, for example, the trees so clearly visible in FIG. 12B are also shown in FIG. 12C to provide definition or further clarity with respect to these bottom features within the more blurry returns provided by the conical downscan sonar data. Specifically, in this example, the trees shown in FIG. 12B are shown in brown overlay in FIG. 12C over the red return data shown from FIG. 12A.

Figure 13A:
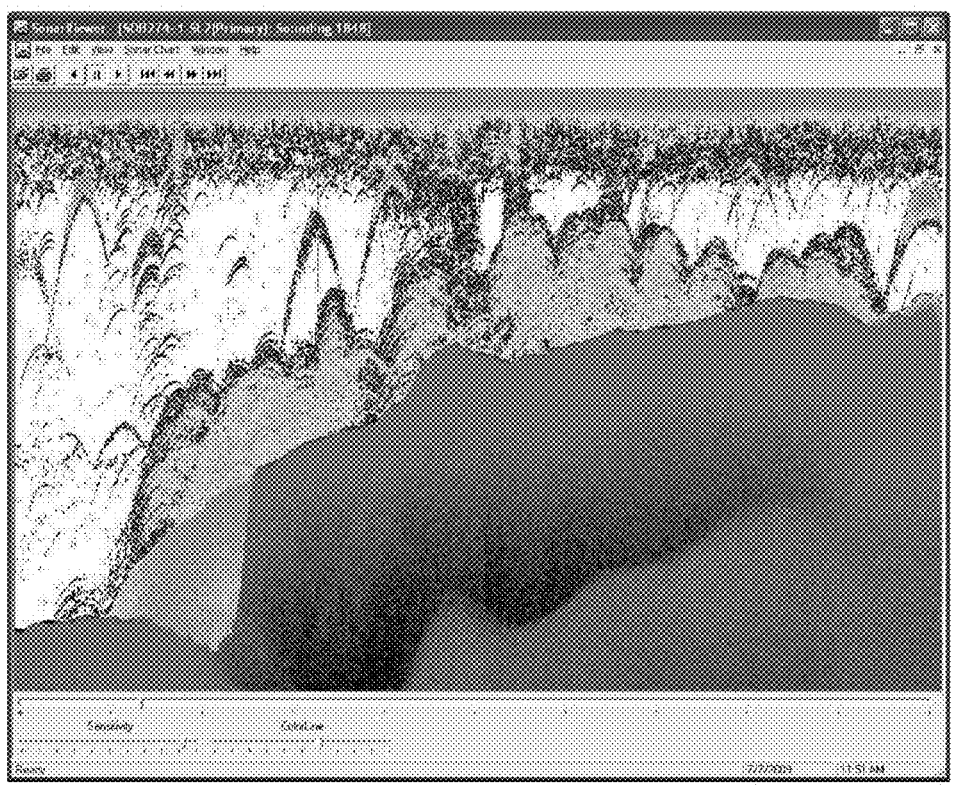
FIG. 13A is an example image of conical downscan sonar data alone according to an exemplary embodiment of the present invention.
Figure 13B:
FIG. 13B illustrates linear downscan sonar data displayed alone in an example image according to an exemplary embodiment of the present invention.
Figure 13C:
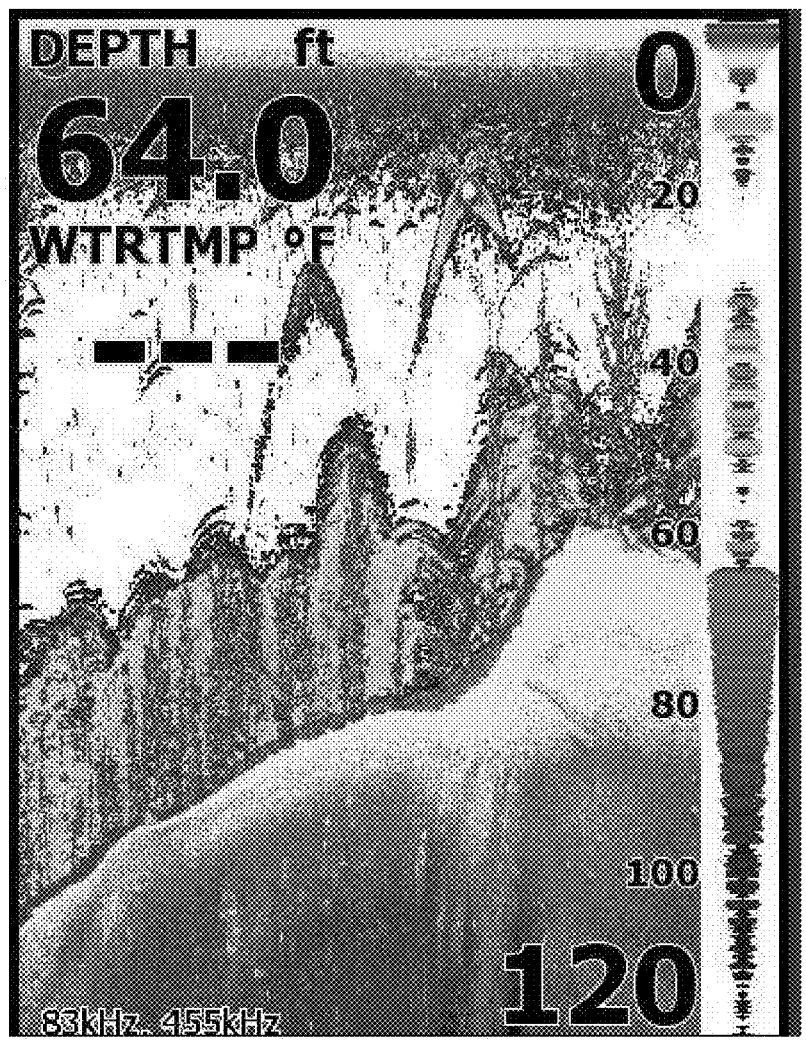
FIG. 13C illustrates combined linear and conical downscan sonar data displayed in a single display window according to an exemplary embodiment of the present invention.

FIG. 13 (which includes FIGS. 13A, 13B and 13C shows another example. In this example, FIG. 13A is an image of conical downscan sonar data alone. FIG. 13B illustrates linear downscan sonar data alone. FIG. 13C illustrates combined linear and conical downscan sonar data. As shown in FIG. 13B, the linear downscan image may be provided on a majority of the display and other information may be provided over the linear downscan image. For example, frequency information (provided at the lower left portion of the display window in this example) and a depth scale (provided on the right edge of the display in this example) may be provided to assist the user in interpreting the image displayed. As such, boat position may be represented by the numeral 0 (e.g., on the right side), or some other desirable icon, for most recent sonar pings, and older sonar data may be presented on the left side of the screen to present a scrolling image as the boat (and transducer) move through the water over time.

Figure 14:
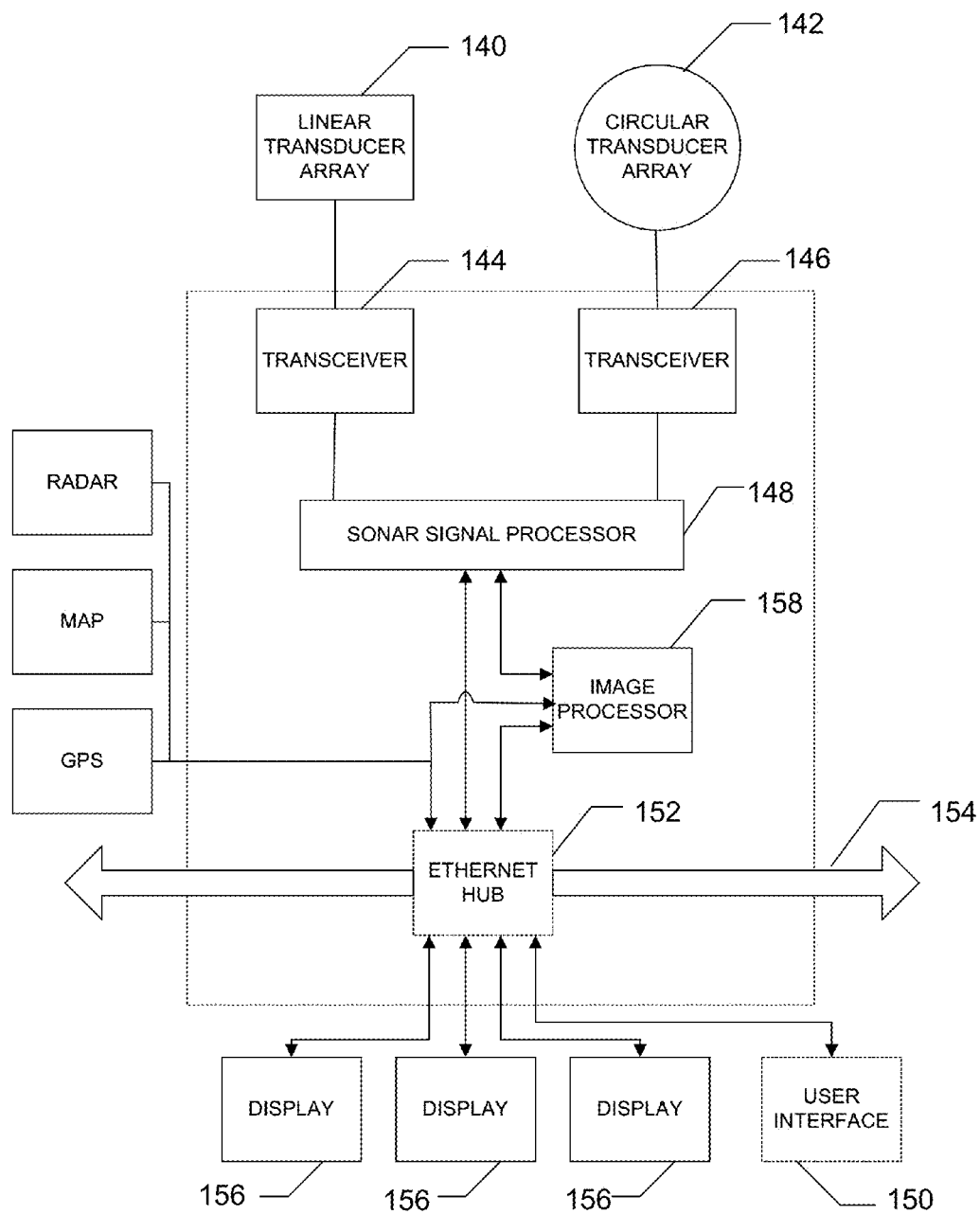
FIG. 14 is a basic block diagram illustrating a sonar system according to an exemplary embodiment of the present invention.

FIG. 14 illustrates an exemplary sonar system incorporating linear and circular downscan transducer arrays 140, 142. The two transducer arrays may be in the same or separate housings and may include one or more transducers in each respective array. The arrays also typically utilize different operational frequencies. Such may also assist in minimizing interference. Similar to the system illustrated in FIG. 5, the transducers are operationally connected to the transceivers 144, 146, which configure the transducer outputs for receipt by a sonar signal processor 148. The sonar signal processor 148 (which may be similar to the sonar signal processor 32 of FIG. 5) executes various programs stored or as may be selected by the user interface 150. The Ethernet hub 152, network 154, displays 156 and user interface 150 operate as described for the corresponding components of FIG. 5. The image processor 158 may perform a variety of functions to optimize or customize the display images, including such features as split screen to show multiple different sonar images or data. Examples include individual and separate images of GPS, waypoints, mapping, nautical charts, GPS tracking, radar, etc., which are typically shown side-by-side or stacked. Additional examples include individual data boxes, such as speed, depth, water, temperature, range or distance scales, location or waypoint, latitude, longitude, time, etc. Still further examples include composite images that combine information from one or more of these sources, such as the images from the linear downstream and circular downstream transducers to overlay the images. For example, the traditional "fish arch" image representing a possible fish using a circular downscan sonar may be imposed over a small white circle or oval representing a possible fish using a linear downscan sonar. Still further, one image may be colorized to distinguish it visibly from data representing another image. As such, for example, the images may be combined using image blending or overlay techniques. Alternatively, individual images may be presented, or different images, simultaneously on different displays without overlay. Image data packets or streams may also have additional data associated therewith, such as time of day, location, temperature, speed, GPS, etc.

Notably, the example of FIG. 14 may be simplified in some embodiments. In this regard, the radar, map and GPS modules of FIG. 14 along with the Ethernet hub 152 may not be included in some embodiments. Moreover, in one example, an embodiment of the present invention may include essentially only processing circuitry to handle inputs from a linear and circular transducer array along with a display in a single device. As such, for example, all of the electronics for handling linear and circular transducer inputs may be included along with a display within a single box, without any Ethernet connection or other peripherals.

Figure 15:
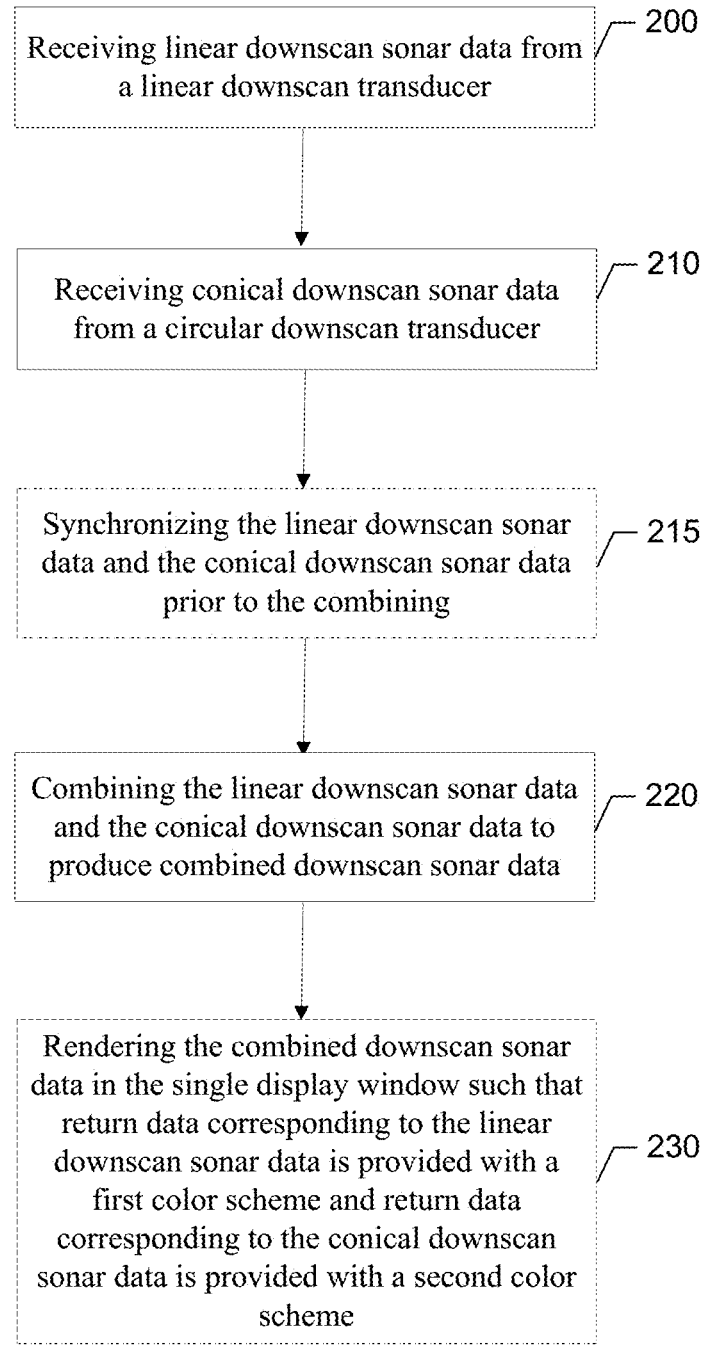
FIG. 15 is a flowchart illustrating a method of producing a combined linear and circular downscan image according to an exemplary embodiment of the present invention.

FIG. 15 is a flowchart of a system, method and program product according to an exemplary embodiment of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the sonar module and executed by a processor in the sonar module. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

As shown in FIG. 15, one embodiment of a method for providing a combined linear and circular downscan sonar display may include receiving linear downscan sonar data from a linear downscan transducer at operation 200 and receiving conical downscan sonar data from a circular downscan transducer at operation 210. The method may further include combining the linear downscan sonar data and the conical downscan sonar data to produce combined downscan sonar data at operation 220. In some cases, additional optional operations may be included, some of which are shown in dashed lines in FIG. 15. For example, the method may further include synchronizing the linear downscan sonar data and the conical downscan sonar data prior to the combining at operation 215. In some cases, the method may further include rendering the combined downscan sonar data in the single display window such that return data corresponding to the linear downscan sonar data is provided with a first color scheme and return data corresponding to the conical downscan sonar data is provided with a second color scheme at operation 230.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sonar apparatus comprising:
a sonar transducer assembly for imaging an underwater environment beneath a watercraft, the sonar transducer assembly comprising:
a housing mountable to the watercraft;
a linear downscan transducer element positioned within the housing, the linear downscan transducer element having a substantially rectangular shape configured to produce a fan-shaped sonar beam having a relatively narrow beamwidth in a direction parallel to a longitudinal length of the linear downscan transducer element and a relatively wide beamwidth in a direction perpendicular to the longitudinal length of the transducer element, the linear downscan transducer element being positioned with the longitudinal length thereof extending in a fore-to-aft direction of the housing, wherein the linear downscan transducer element is positioned within the housing to project fan-shaped sonar beams directly beneath the watercraft; and
a second downscan transducer element positioned within the housing, the second downscan transducer element being configured to produce a generally conical beam that is wider than the fan-shaped sonar beam in a direction parallel to a longitudinal length of the linear downscan transducer element, wherein the second downscan transducer element is positioned within the housing to project conical beams directly beneath the watercraft.

2. The sonar apparatus of claim 1, further comprising a sonar signal processor configured to:
receive linear downscan sonar data based on sonar returns from the fan-shaped sonar beams produced by the linear downscan transducer element;
receive conical downscan sonar data based on sonar returns from the generally conical beams produced by the second downscan transducer element;
combine the linear downscan sonar data and the conical downscan sonar data to produce combined downscan sonar data; and
render the combined downscan sonar data as at least one image on a display.

3. The sonar apparatus of claim 2, wherein the sonar signal processor is configured to receive the linear downscan sonar data and the conical downscan sonar data corresponding to respective underwater regions that at least partially overlap.

4. The sonar apparatus of claim 2, wherein the sonar signal processor is configured to combine the linear downscan sonar data and the conical downscan sonar data to be displayable in a single display window.

5. The sonar apparatus of claim 2, wherein the sonar signal processor is further configured to synchronize the linear downscan sonar data and the conical downscan sonar data prior to the combining.

6. The sonar apparatus of claim 5, wherein the sonar signal processor is configured to synchronize the linear downscan sonar data and the conical downscan sonar data and to utilize a predetermined interval of linear downscan transmissions from the linear downscan transducer as a reference for synchronization with the conical downscan sonar data.

7. The sonar apparatus of claim 5, wherein the sonar signal processor is configured to synchronize the linear downscan sonar data and the conical downscan sonar data and to utilize a predetermined interval of downscan transmissions from the second downscan transducer as a reference for synchronization with the linear downscan sonar data.

8. The sonar apparatus of claim 5, wherein the sonar signal processor is configured to synchronize the linear downscan sonar data and the conical downscan sonar data and to utilize a predetermined time interval as a reference for synchronization.

9. The sonar apparatus of claim 2, wherein the sonar signal processor is configured to combine the linear downscan sonar data and the conical downscan sonar data to render base data corresponding to one of the linear downscan sonar data or the conical downscan sonar data and render overlay data corresponding to the other of the linear downscan sonar data or the conical downscan sonar data over the base data.

10. The sonar apparatus of claim 9, wherein the sonar signal processor is configured to render overlay data corresponding to the other of the linear downscan sonar data or the conical downscan sonar data over the base data and apply a level mask to the overlay data and render only data above a predefined threshold associated with the level mask as the overlay data.

11. The sonar apparatus of claim 2, wherein the sonar signal processor is configured to combine the linear downscan sonar data and the conical downscan sonar data and blend the linear downscan sonar data with the conical downscan sonar data and render the blended data.

12. The sonar apparatus of claim 11, wherein the sonar signal processor is configured to blend the linear downscan sonar data with the conical downscan sonar data, apply a first weighting factor to the linear downscan sonar data to produce first weighted data, apply a second weighting factor to the conical downscan sonar data to produce second weighted data, and to combine the first weighted data and second weighted data into combined weighted data and render the combined weighted data.

13. The sonar apparatus of claim 2, wherein the sonar signal processor is configured to combine the linear downscan sonar data and the conical downscan sonar data to:
form first data columns of the conical downscan sonar data;
form second data columns of the linear downscan sonar data corresponding to each of the first data columns; and
render base data from one of the first data columns or the second data columns and render at least a portion of overlay data from the other of the first data columns or the second data columns over the base data.

14. The sonar apparatus of claim 13, wherein the sonar signal processor is configured to form the second data columns to store a plurality of linear downscan sonar data columns corresponding to each of the first data columns and merge the plurality of linear downscan sonar data columns to produce one second data column corresponding to each first data column.

15. The sonar apparatus of claim 2, wherein the sonar signal processor is configured to combine the linear downscan sonar data and the conical downscan sonar data to combine the linear downscan sonar data and the conical downscan sonar data based on a user selected sensitivity.

16. The sonar apparatus of claim 2, wherein the sonar signal processor is further configured to render the combined downscan sonar data in the single display window such that return data corresponding to the linear downscan sonar data is provided with a first color scheme and return data corresponding to the conical downscan sonar data is provided with a second color scheme.

17. The sonar apparatus of claim 16, wherein the sonar signal processor is configured to render the combined downscan sonar data to enable user selection of a color palette for return data corresponding to the linear downscan sonar data with a first color scheme and return data corresponding to the conical downscan sonar data with a second color scheme.

18. The sonar apparatus of claim 16, wherein the sonar signal processor is configured to render the combined downscan sonar data to enable user selection of a color palette for return data corresponding to the linear downscan sonar data with a first shading or cross-hatching scheme and return data corresponding to the conical downscan sonar data with a second shading or cross-hatching scheme.

19. The sonar apparatus of claim 2, wherein the sonar signal processor is further configured to enable user selection of a rendering option to:
render only the conical downscan sonar data in a single display window;
render only the linear downscan sonar data in the single display window;
render only the combined downscan sonar data in the single display window;
render the conical downscan sonar data, the linear downscan sonar data and the combined downscan sonar data each in respective different display windows;
render the conical downscan sonar data and the linear downscan sonar data each in respective different display windows; or
render one of the conical downscan sonar data or the linear downscan sonar data with the combined downscan sonar data such that the combined downscan sonar data and the one of the conical downscan sonar data or the linear downscan sonar data are each provided in respective different display windows.

20. The sonar apparatus of claim 2, wherein the sonar signal processor is part of a sonar module in a single housing.

21. The sonar apparatus of claim 2, further comprising a display configured to display images representing sonar signals.

22. The sonar apparatus of claim 21, wherein the display is configured to render different images on the same display.

23. The sonar apparatus of claim 1, further comprising a display and a sonar module including a sonar signal processor, the display and the sonar module being within a same housing.

24. The sonar apparatus of claim 23, wherein the display is configured to render data from sources of data including at least one of the group of radar, GPS, digital mapping, time and temperature.

25. The sonar apparatus of claim 23, wherein a display format for the display is user selectable.

26. The sonar apparatus of claim 1, wherein the linear downscan transducer element is configured to provide data indicative of one or more of depth, water column features and bottom features.

27. The sonar apparatus of claim 1, wherein the linear downscan transducer element and the second downscan transducer element are configured to provide data simultaneously.

28. The sonar apparatus of claim 1, wherein the linear downscan transducer is configured to transmit sonar pulses across multiple frequencies.

29. The sonar apparatus of claim 1, wherein the second downscan transducer is configured to transmit sonar pulses across multiple frequencies.

30. The sonar apparatus of claim 1, wherein the linear downscan transducer is configured to transmit sonar pulses across a range of frequencies.

31. The sonar apparatus of claim 1, wherein the second downscan transducer is configured to transmit sonar pulses across a range of frequencies.

32. The sonar apparatus of claim 1, further comprising a sonar signal processor configured to:
receive linear downscan sonar data based on sonar returns from the fan-shaped sonar beams produced by the linear downscan transducer element;
receive conical downscan sonar data based on sonar returns from the generally conical beams produced by the second downscan transducer element; and
render at least one of linear downscan sonar data or conical downscan sonar data on a display.

33. The sonar apparatus of claim 32, wherein the sonar signal processor is further configured to:
render linear downscan sonar data on one portion of the display; and
render conical downscan sonar data on another portion of the display.

34. The sonar apparatus of claim 33, wherein the sonar signal processor is configured to render the linear downscan sonar data and the conical downscan sonar data side-by-side on the display.

35. A sonar system comprising:
a sonar transducer assembly for imaging an underwater environment beneath a watercraft, the sonar transducer assembly comprising:
a housing mountable to the watercraft;
a linear downscan transducer element positioned within the housing, the linear downscan transducer element having a substantially rectangular shape configured to produce a fan-shaped sonar beam having a relatively narrow beamwidth in a direction parallel to a longitudinal length of the linear downscan transducer element and a relatively wide beamwidth in a direction perpendicular to the longitudinal length of the transducer element, the linear downscan transducer element being positioned with the longitudinal length thereof extending in a fore-to-aft direction of the housing, wherein the linear downscan transducer element is positioned within the housing to project fan-shaped sonar beams directly beneath the watercraft; and a second downscan transducer element positioned within the housing, the second downscan transducer element being configured to produce a generally conical beam that is wider than the fan-shaped sonar beam in a direction parallel to a longitudinal length of the linear downscan transducer element, wherein the second downscan transducer element is positioned within the housing to project conical beams directly beneath the watercraft;

a sonar signal processor configured to:
receive linear downscan sonar data based on sonar returns from the fan-shaped sonar beams produced by the linear downscan transducer element;
receive conical downscan sonar data based on sonar returns from the generally conical beams produced by the second downscan transducer element; and a display, wherein the sonar signal processor is configured to render at least one of linear downscan sonar data or conical downscan sonar data on the display.

36. The sonar system of claim 35, wherein the sonar signal processor is further configured to:
render linear downscan sonar data on one portion of the display; and
render conical downscan sonar data on another portion of the display.

37. The sonar system of claim 36, wherein the sonar signal processor is further configured to render the linear downscan sonar data and the conical downscan sonar data side-by-side on the display.

38. The sonar system of claim 35, wherein the linear downscan transducer is configured to transmit sonar pulses across multiple frequencies.

39. The sonar system of claim 35, wherein the second downscan transducer is configured to transmit sonar pulses across multiple frequencies.

40. The sonar system of claim 35, wherein the linear downscan transducer is configured to transmit sonar pulses across a range of frequencies.

41. The sonar system of claim 35, wherein the second downscan transducer is configured to transmit sonar pulses across a range of frequencies.

42. The sonar apparatus of claim 32, wherein the linear downscan sonar data and the conical downscan sonar data represent sonar returns from the same regions beneath the watercraft.

43. The sonar apparatus of claim 32, wherein the linear downscan sonar data and the conical downscan sonar data represent sonar returns from regions beneath the watercraft that at least partially overlap.

44. The sonar apparatus of claim 32, wherein the sonar signal processor is further configured to:
render the linear downscan sonar data in a first color scheme; and
render the conical downscan sonar data in a second color scheme.

45. The sonar apparatus of claim 32, wherein the linear downscan transducer element and the second downscan transducer element are configured to provide data to the sonar signal processor simultaneously.

46. The sonar apparatus of claim 32, wherein the sonar signal processor is further configured to:
render at least one of linear downscan sonar data or conical downscan sonar data on one portion of the display; and
render a nautical chart on another portion of the display.

47. The sonar apparatus of claim 32, wherein the sonar signal processor is further configured to render at least one data box on the display, wherein the data box comprises at least one of speed data, depth data, temperature data, position data, or time data.

48. The sonar apparatus of claim 1, wherein the second downscan transducer element is mounted in the housing in line with the longitudinal length of the linear downscan transducer element.

49. The sonar apparatus of claim 48, wherein the second downscan transducer element and the linear downscan transducer element are mounted in line with the longitudinal axis of the housing.

50. The sonar apparatus of claim 1, wherein the sonar transducer assembly further comprises an additional downscan transducer element positioned within the housing, wherein the additional downscan transducer element is a linear transducer element configured to produce a fan-shaped sonar beam, wherein the additional downscan transducer element is positioned within the housing to project the fan-shaped sonar beam directly beneath the watercraft.

51. The sonar apparatus of claim 50, wherein the linear downscan transducer element and the additional downscan transducer element are positioned end to end within the housing.

52. The sonar apparatus of claim 51, wherein the linear downscan transducer element and the additional downscan transducer element are electrically connected.

53. The sonar apparatus of claim 1, wherein the linear downscan transducer element comprises at least a first linear transducer element segment and a second linear transducer element segment.

54. The sonar apparatus of claim 53, wherein the first linear transducer element segment and the second linear transducer element segment are electrically connected and positioned end-to-end within the housing.

55. The sonar system of claim 35, wherein the linear downscan sonar data and the conical downscan sonar data represent sonar returns from the same regions beneath the watercraft.

56. The sonar system of claim 35, wherein the linear downscan sonar data and the conical downscan sonar data represent sonar returns from regions beneath the watercraft that at least partially overlap.

57. The sonar system of claim 35, wherein the sonar signal processor is further configured to:
render the linear downscan sonar data in a first color scheme; and
render the conical downscan sonar data in a second color scheme.

58. The sonar system of claim 35, wherein the linear downscan transducer element and the second downscan transducer element are configured to provide data to the sonar signal processor simultaneously.

59. The sonar system of claim 35, wherein the sonar signal processor is further configured to:
render at least one of linear downscan sonar data or conical downscan sonar data on one portion of the display; and
render a nautical chart on another portion of the display.

60. The sonar system of claim 35, wherein the sonar signal processor is further configured to render at least one data box on the display, wherein the data box comprises at least one of speed data, depth data, temperature data, position data, or time data.

61. The sonar system of claim 35, wherein the second downscan transducer element is mounted in the housing in line with the longitudinal length of the linear downscan transducer element.

62. The sonar system of claim 61, wherein the second downscan transducer element and the linear downscan transducer element are mounted in line with the longitudinal axis of the housing.

63. The sonar system of claim 35, wherein the sonar transducer assembly further comprises an additional downscan transducer element positioned within the housing, wherein the additional downscan transducer element is a linear transducer element configured to produce a fan-shaped sonar beam, wherein the additional downscan transducer element is positioned within the housing to project the fan-shaped sonar beam directly beneath the watercraft.

64. The sonar system of claim 63, wherein the linear downscan transducer element and the additional downscan transducer element are positioned end to end within the housing.

65. The sonar system of claim 64, wherein the linear downscan transducer element and the additional downscan transducer element are electrically connected.

66. The sonar system of claim 35, wherein the linear downscan transducer element comprises at least a first linear transducer element segment and a second linear transducer element segment.

67. The sonar system of claim 66, wherein the first linear transducer element segment and the second linear transducer element segment are electrically connected and positioned end-to-end within the housing.

68. A method for imaging an underwater environment beneath a watercraft, the method comprising:
- producing a fan-shaped sonar beam from a linear downscan transducer element positioned within a housing mounted to the watercraft, wherein the linear downscan transducer element defines a substantially rectangular shape, wherein the fan-shaped sonar beam defines a relatively narrow beamwidth in a direction parallel to a longitudinal length of the linear downscan transducer element and a relatively wide beamwidth in a direction perpendicular to the longitudinal length of the transducer element, the linear downscan transducer element being positioned with the longitudinal length thereof extending in a fore-to-aft direction of the housing, wherein the linear downscan transducer element is positioned within the housing to project fan-shaped sonar beams directly beneath the watercraft;
- producing a generally conical beam from a second downscan transducer element positioned within the housing, the conical beam being wider than each fan-shaped sonar beam in a direction parallel to a longitudinal length of the linear downscan transducer element, wherein the second downscan transducer element is positioned within the housing to project conical beams directly beneath the watercraft;
- receiving linear downscan sonar data based on sonar returns from the fan-shaped sonar beams produced by the linear downscan transducer element;
- receiving conical downscan sonar data based on sonar returns from the generally conical beams produced by the second downscan transducer element; and
- rendering at least one of the linear downscan sonar data or the conical downscan sonar data on a display.

* * * * *